United States Patent [19]
Fukui et al.

[11] Patent Number: 5,719,613
[45] Date of Patent: Feb. 17, 1998

[54] APPARATUS FOR FORMING AN IMAGE WITH USE OF ELECTROPHOTOGRAPHIC PROCESS

[75] Inventors: Kazuyuki Fukui, Toyohashi; Takanobu Yamada, Toyokawa, both of Japan

[73] Assignee: Minolta Co., Ltd., Osaka, Japan

[21] Appl. No.: 456,409

[22] Filed: Jun. 1, 1995

Related U.S. Application Data

[62] Division of Ser. No. 104,404, Aug. 10, 1993, which is a continuation of Ser. No. 671,964, Mar. 19, 1991, abandoned.

[30] Foreign Application Priority Data

| Mar. 20, 1990 | [JP] | Japan | 2-071402 |
| Mar. 20, 1990 | [JP] | Japan | 2-071403 |
| Mar. 20, 1990 | [JP] | Japan | 2-071404 |

[51] Int. Cl.⁶ ......................... B41J 2/385; G03G 21/00; H04N 1/29
[52] U.S. Cl. ..................... 347/132; 399/46; 358/406
[58] Field of Search ........................ 347/140, 158, 347/129, 133, 131, 132; 355/208, 246; 399/46, 48, 50, 51, 55, 74; 358/406, 448, 458, 461, 475

[56] References Cited

U.S. PATENT DOCUMENTS

| 4,432,634 | 2/1984 | Tabuchi | 347/131 X |
| 4,679,057 | 7/1987 | Hamada | 347/252 |
| 4,879,577 | 11/1989 | Mabrouk et al. | 399/46 |
| 4,890,125 | 12/1989 | Egawa et al. | 347/137 |
| 4,914,459 | 4/1990 | Mama et al. | 347/133 |
| 4,989,039 | 1/1991 | Hayashi et al. | 399/44 |
| 5,194,878 | 3/1993 | Murakami et al. | 347/115 |
| 5,206,686 | 4/1993 | Fukui et al. | 358/406 X |

FOREIGN PATENT DOCUMENTS

| 55-15169 | 2/1980 | Japan |
| 59-140647 | 8/1984 | Japan |
| 1-196347 | 8/1989 | Japan |

*Primary Examiner*—David F. Yockey
*Attorney, Agent, or Firm*—Burns, Doane, Swecker & Mathis, LLP

[57] ABSTRACT

In a apparatus for forming a digital image with use of electrophotographic process wherein the gradation is expressed by changing the laser intensity according to image information, at least one of the surface electric potential $V_O$ of photoconductor and the development bias electric voltage $V_B$ is controlled, and the laser intensity is controlled for gradation correction to compensate a change in gradation due to the control of $V_O$ and $V_B$. A ratio of variable differences of potential in the apparatus, $(V_B-V_I)/(V_O-V_I)$, is kept constant to control the gamma characteristic in the apparatus.

16 Claims, 26 Drawing Sheets

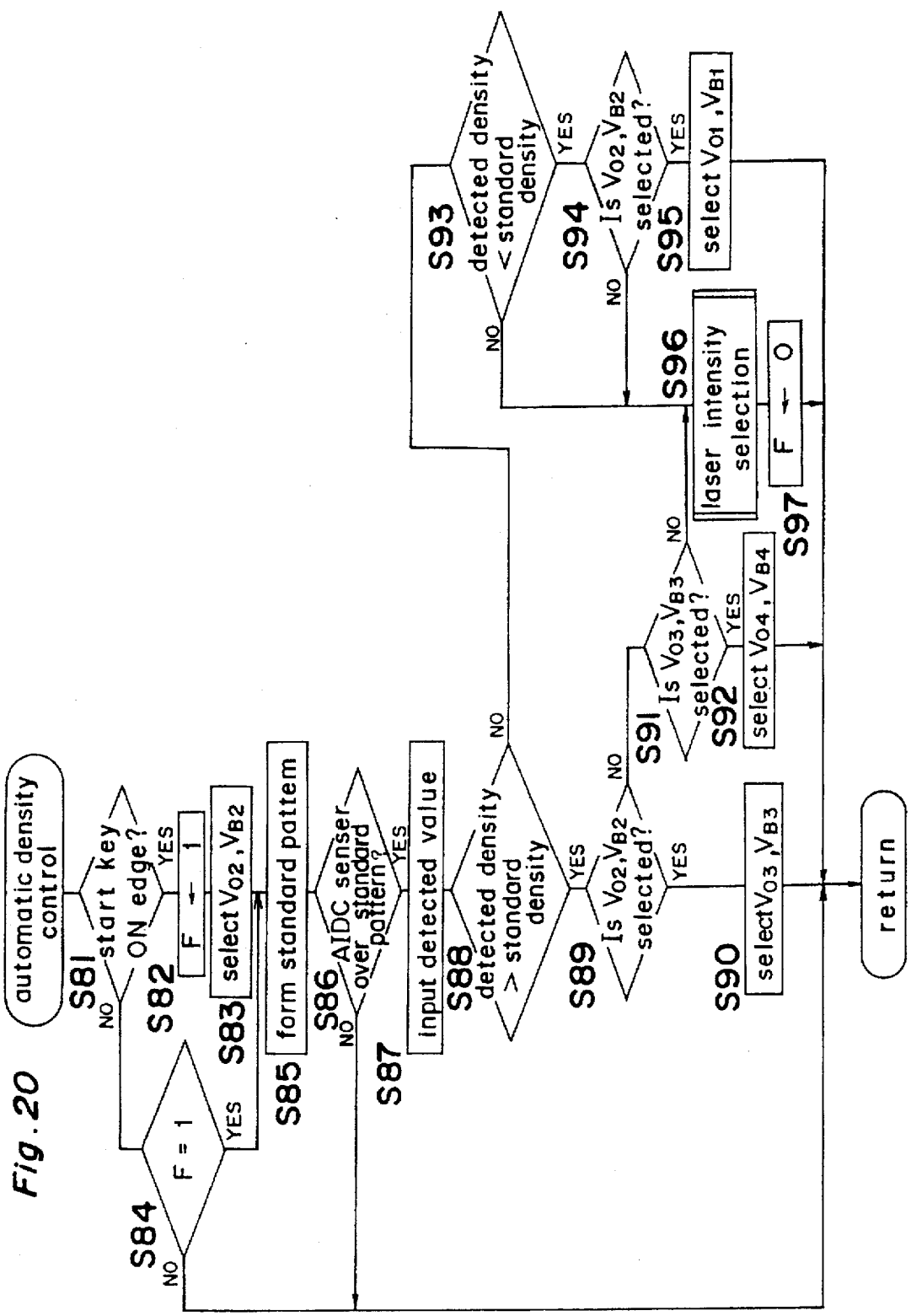

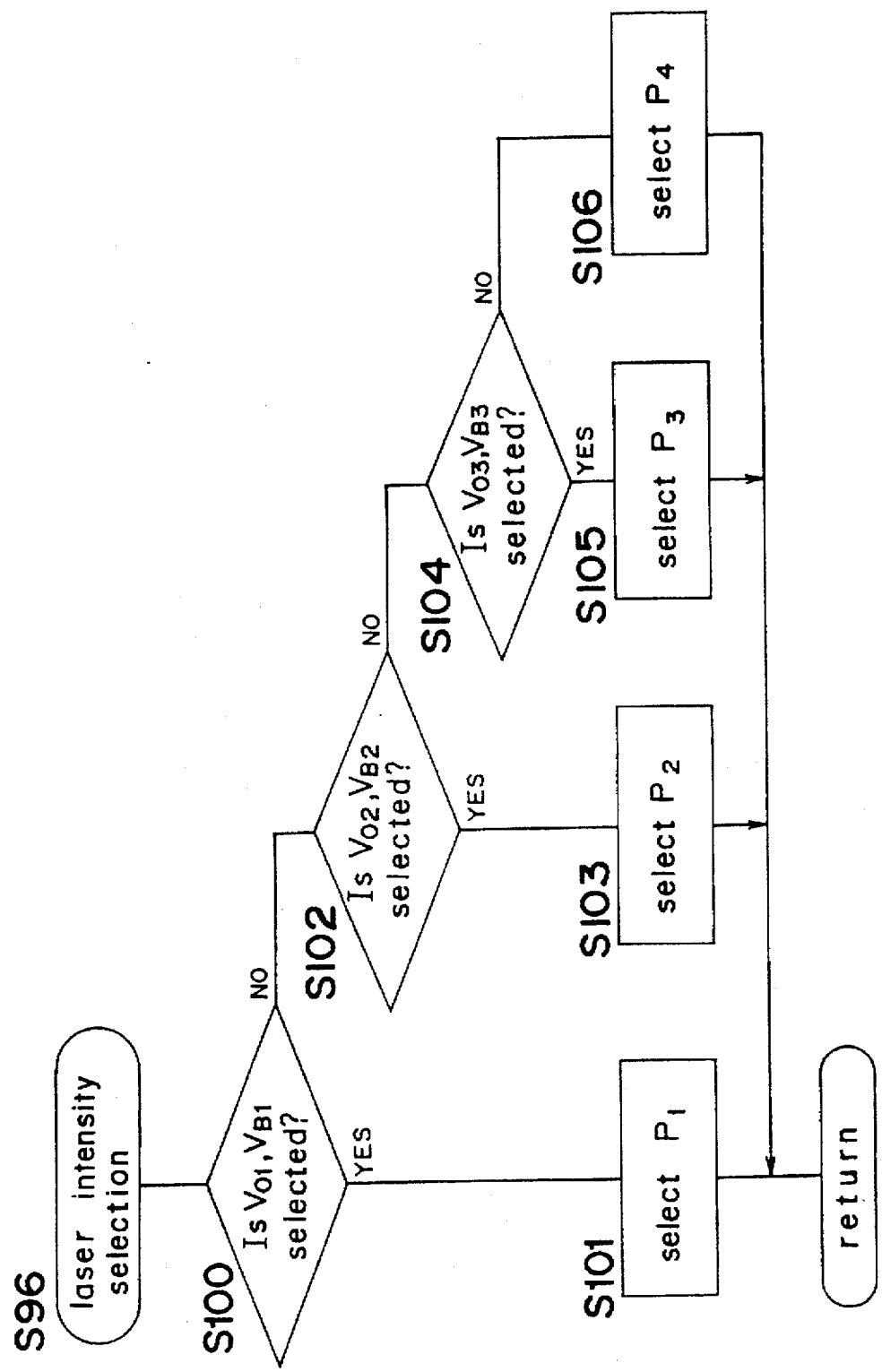

APPARATUS FOR FORMING AN IMAGE WITH USE OF ELECTROPHOTOGRAPHIC PROCESS

This application is a divisional of application Ser. No. 08/104,404, pending filed Aug. 10, 1993, which is a continuation of application Ser. No. 07/671,964, abandoned filed Mar. 19, 1991.

BACKGROUND OF THE INVENTION

1. Field of the Invention

The present invention relates to an apparatus for forming an image with use of electrophotographic process, such as a digital copying machine, a digital printer or the like.

2. Description of Related Art

Various kinds of an apparatus such as a laser printer have been used practically for forming an image with use of electrophotographic process by exposing the photoconductor with a light beam according to image data which have been converted into digital values, while various kinds of methods for forming a digital image have been suggested in order to reproduce a half-tone image such as a picture with high fidelity.

Among such methods are known an area gradation method with use of a dither and matrix a multi-level laser exposure method (such as the pulse width modulation method or the light-intensity modulation method) wherein the gradation for a dot to be printed is expressed by the quantity of laser light (which is equal to the product of the light-emitting time and the light intensity) by changing the pulse width (light-emitting time) or the light intensity, (refer for example Japanese patent laid-open publication No. 91077/1987, No. 39972/1987, No. 188562/1987 and No. 22597/1986). Further, multi-level dither methods in combination of the dither method with the pulse width modulation method or light intensity modulation method are also known.

It is possible in principle to reproduce an image density with gradation by using one-to-one correspondence uniquely to the gradation of image data to be reproduced by using such a method. However, the image density to be reproduced (hereinafter referred to as image density) is not proportional to the density of a document owing to complex factors such as the photosensitive characteristic of the photoconductor, the characteristics of toners and the environment to be used. The nonlinear characteristic which deviates from the linear characteristic to be realized is called the gamma characteristic generally or the gradation characteristic, and this nonlinear gamma characteristic is one of the important factors to lower the fidelity of a reproduced image especially of a half-tone document.

In order to improve the fidelity of a reproduced image, the so-called gamma correction is adopted so that an image can be reproduced with fidelity according to the document image. In the gamma correction, a document density data to be read is transformed by using a predetermined transformation table for gamma correction, and a digital image is formed according to the transformed document density.

Further, there are many factors which affect the image density. One of the factors is a phenomenon that the amount of toners adhered to the photoconductor on the development varies with the changes in external environment such as temperature or humidity according to the characteristics of the photoconductors and the toners. It is known generally that at an environment of high temperature and high humidity the amount of the adhered toners increases and the gamma characteristic increases sharply around the origin, so as to make the density of the reproduced image large, whereas at the environment of low temperature and low humidity the amount of the adhered toners decreases and the gamma characteristic increases mildly around the origin, so as to make the density of the reproduced image small.

In order to stabilize the image density against such environmental change, the toner density is controlled so as to keep the maximum image density constant in a copying machine or a printer with use of electrophotographic process.

In a method adopted generally for the toner density control, the surface electric potential of the photoconductor and the development bias electric voltage are changed manually or automatically according to the toner density of a standard toner image formed on the photoconductor.

However, such changes in surface electric potential and development bias electric voltage generally affect the gamma characteristic largely.

SUMMARY OF THE INVENTION

It is an object of the present invention to provide a method for forming a digital image wherein the change in the gamma characteristic caused as a result of the density control can be compensated so as to realize a reproduced image of a document of constant gradation reproducibility.

A first apparatus according to the present invention for forming an image according to digital image data with use to electrophotographic process, comprises: a photoconductor; sensitizing means for sensitizing said photoconductor at a sensitizing electric potential; exposure means for exposing said photoconductor to be sensitized beforehand by said sensitizing means to form an electrostatic latent image at a quantity of light determined on the basis of digital image data; first change means for changing the sensitizing electric potential of the sensitizing charger means; and second change means for changing the quantity of light of said exposure means according to the change in the sensitizing electric potential by said first change means so as to keep the gradation characteristic constant.

A second apparatus according to the present invention for forming an image according to digital image data with use to electrophotographic process, comprises: a photoconductor; sensitizing means for sensitizing said photoconductor at a sensitizing electric potential; exposure means for exposing said photoconductor to be sensitized beforehand by said sensitizing means to form an electrostatic latent image at a quantity of light on the basis of digital image data; development means for developing the electrostatic latent image; supply means for supplying a bias electric voltage to said development means, which bias electric voltage being given to toners; first change means for changing the development bias electric voltage; and second change means for changing the quantity of light of said exposure means according to the change in the development bias electric voltage of said supply means by said first change means so as to keep the gradation characteristic constant.

A third apparatus according to the present invention for forming an image according to digital image data with use to electrophotographic process, comprises: a photoconductor; sensitizing means for sensitizing said photoconductor at a sensitizing electric potential; exposure means for exposing said photoconductor to be sensitized beforehand by said sensitizing means to form an electrostatic latent image at a quantity of light determined on the basis of digital image data; development means for developing the electrostatic latent image; bias means for supplying a bias electric voltage to said development means, which bias electric voltage being given to toners; first change means for changing at least either of the sensitizing electric potential and the development bias electric voltage; and second change means for changing the quantity of light of said exposure means according to the change in at least either of the sensitizing electric potential and the development bias electric voltage means by said first change means so as to keep the gradation characteristic constant.

A fourth apparatus according to the present invention for forming an image according to digital data with use of electrophotographic process, comprises: a photoconductor; sensitizing means for sensitizing said photoconductor at a sensitizing electric potential; exposure means for exposing said photoconductor to be sensitized beforehand by said sensitizing means to form an electrostatic latent image; development means for developing the electrostatic latent image; bias means for supplying a bias electric voltage to said development means, which bias electric voltage being given to toners; and control means for controlling a ratio of a difference voltage between the sensitizing electric potential and an electric potential of the electrostatic latent image exposed at the maximum quantity of light by said exposure means with respect to a difference voltage between the development bias electric potential supplied by said bias means and the electric potential of the electrostatic latent image so that the ratio is kept constant.

A fifth apparatus according to the present invention for forming an image according to digital data with use of electrophotographic process, comprises: a photoconductor; sensitizing means for sensitizing said photoconductor at a sensitizing electric potential; exposure means for exposing said photoconductor to be sensitized beforehand by said sensitizing means to form an electrostatic latent image; development means for developing the electrostatic latent image; supply means for supplying a bias electric voltage to said development means, which bias electric voltage being given to toners; selection means for selecting a value; and control means for controlling a ratio of a difference voltage between the sensitizing electric potential and an electric potential of the electrostatic latent image exposed at the maximum quantity of light by said exposure means with respect to a difference voltage between the development bias electric potential supplied by said supply means and the electric potential of the electrostatic latent image so that the ratio has the value selected by said selection means.

It is an advantage of the present invention that a reproduced image of good fidelity can be obtained with use of the density control irrespective of a change in environment.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIG. 20 is a flowchart of the automatic density control.

FIG. 21 is a flowchart of the laser intensity selection.

DETAILED DESCRIPTION OF THE PREFERRED EMBODIMENT

Copying machines according to the present invention will be explained below with reference to the drawings.

(a) structure of digital color copying machine

Figure 1:
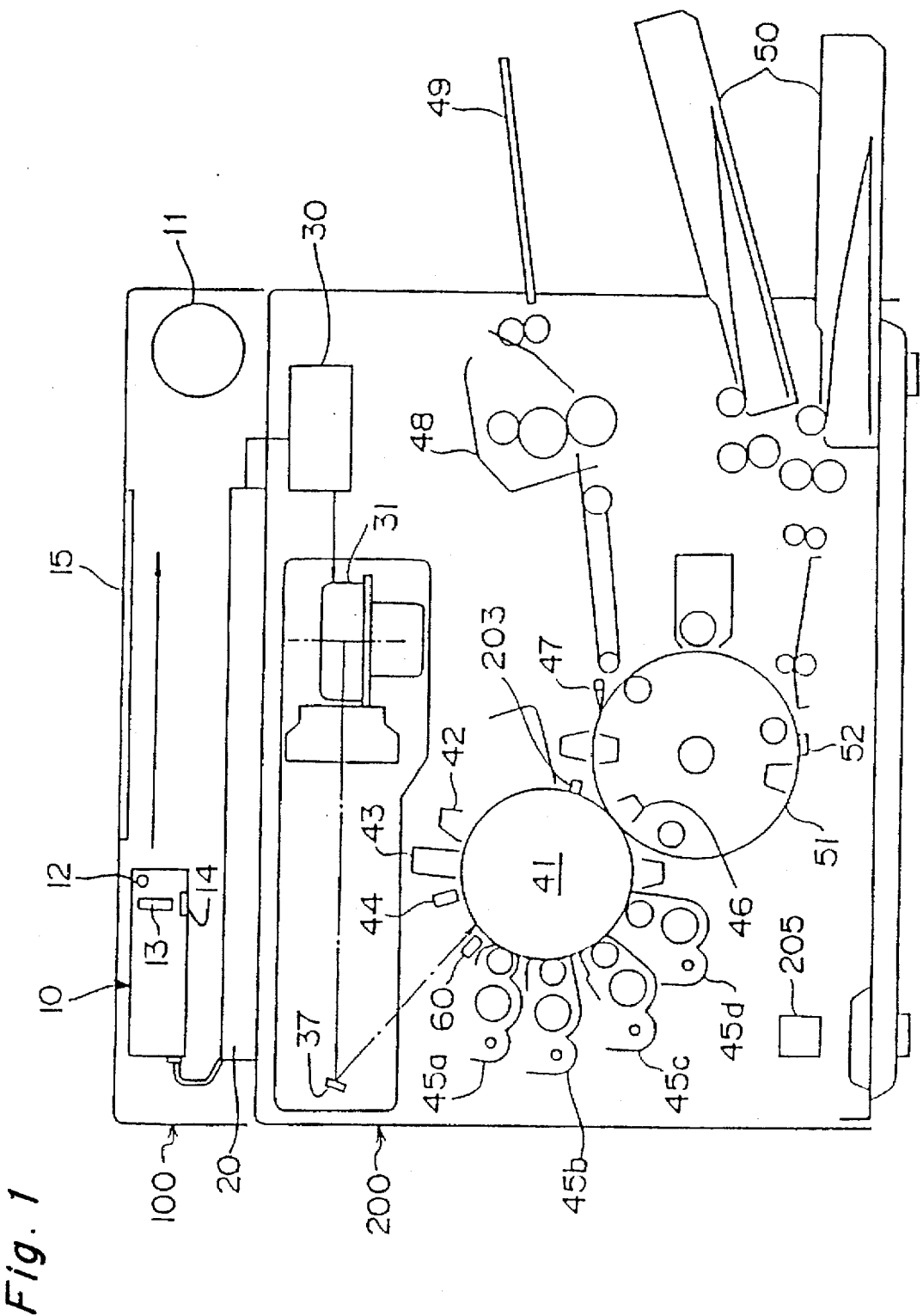
FIG. 1 is a sectional view of a digital color copying machine.

Referring now to the drawings, wherein like reference characters designate like or corresponding parts throughout the drawings, FIG. 1 shows the entire structure of a digital color copying machine according to an embodiment of the present invention. The copying machine consists mainly of an image reader part 100 for reading the image of a document and a print part 200 for reproducing the image read by the image reader part 100 with use of electrophotographic process.

In the image reader part 100, a scanner 10 has an exposure lamp 12 for illumination of a document, a rod lens array 13 for concentration of the reflecting light from the document, and a charge-coupled device (CCD) color image sensor 14 of a contact type for transducing the concentrated light to an electric signal. The scanner 10 is driven by a motor 11, when a document is read, to move in a direction (subscan direction) shown by an arrow so as to scan the document placed on a platen 15. The image of the document illuminated by the exposure lamp 12 is transduced into an electric signal by the image sensor 14. Multi-level electric signals of three colors of red (R), green (G) and blue (B) obtained by the image sensor 14 are converted into 8-bit gradation data of four colors of yellow (Y), magenta (M), cyan (C) and black (B) and the gradation data are stored in a buffer memory 30 for synchronization.

Figure 4:
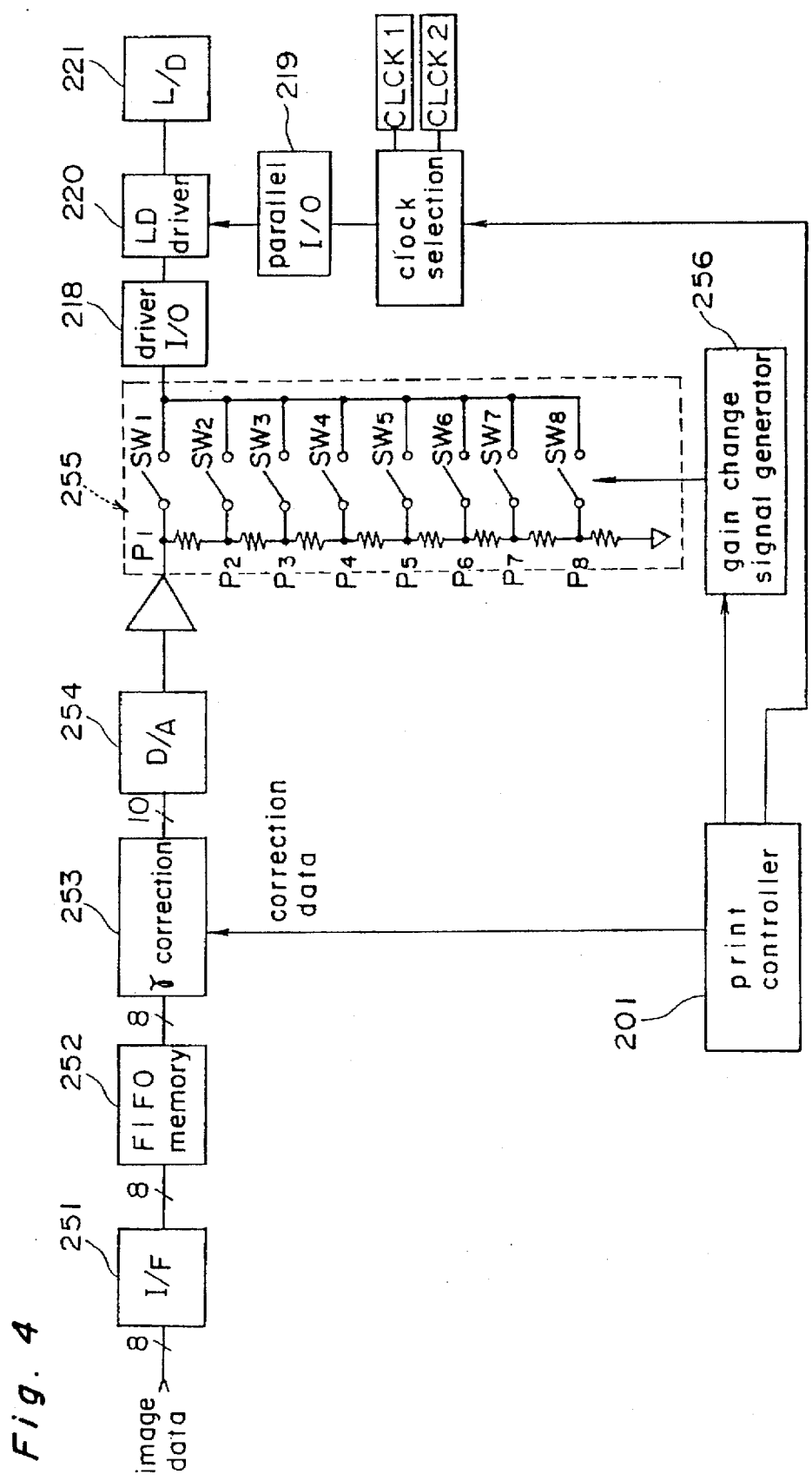
FIG. 4 is a block diagram of the image processor.

Next, in the copying part 200, a print head unit 31 performs the gradation correction (that is, gamma correction) of the received gradation data according to the gradation characteristics in the electrophotographic process for forming an image, converts the corrected gradation data into analog data, and generates a driving signal of a laser diode 221 (FIG. 2) so as to make the laser diode emit a beam (refer FIG. 4).

The laser beam emitted from the print head unit 31 according to the gradation data exposes a photoconductor drum 41 via a reflecting mirror 37. In each copy action, the photoconductor drum 41 having a photoconductor layer, driven to be rotated, is illuminated by an eraser lamp 42, and the photoconductor layer is sensitized by a sensitizing charger 43 uniformly. When the exposure of the photoconductor drum 41 is performed in this state, an electrostatic latent image of a document is formed on the photoconductor drum 41. Then, one of toner development units 45a–45d of cyan, magenta, yellow and black is selected and develops the electrostatic latent image on the photoconductor drum 41 to form a toner image, which is transferred by a transfer charger 46 to a paper wound on a transfer drum 51. On the other hand, a standard toner image is formed in a predetermined area,on the photoconductor drum 41 which is exposed at a predetermined light intensity and is developed. The amount of the adhered toners of the standard toner image is detected optically by an AIDC sensor 203. That is, the toner image is illuminated obliquely, and the lights reflected normally and scattered from the toner image are detected. The amount of the adhered toners can be obtained from the quantity of the reflecting lights.

The above-mentioned print process is iterated as to the four colors of yellow (Y), magenta (M), cyan (C) and black (B). The scanner 10 repeats in each process the scan action in synchronization with the action of the photoconductor drum 41 and the transfer drum 51. Then, the paper is separated from the transfer drum 51 by operating a separation claw 47, is fixed by a fixing unit 48, and is discharged in a tray 49. A paper is fed by a paper cassette 50, is chucked at its front tip on the transfer drum 51 by a chucking mechanism 52 so as not to cause a discrepancy of the position of a paper when the transfer is performed.

Figure 2:
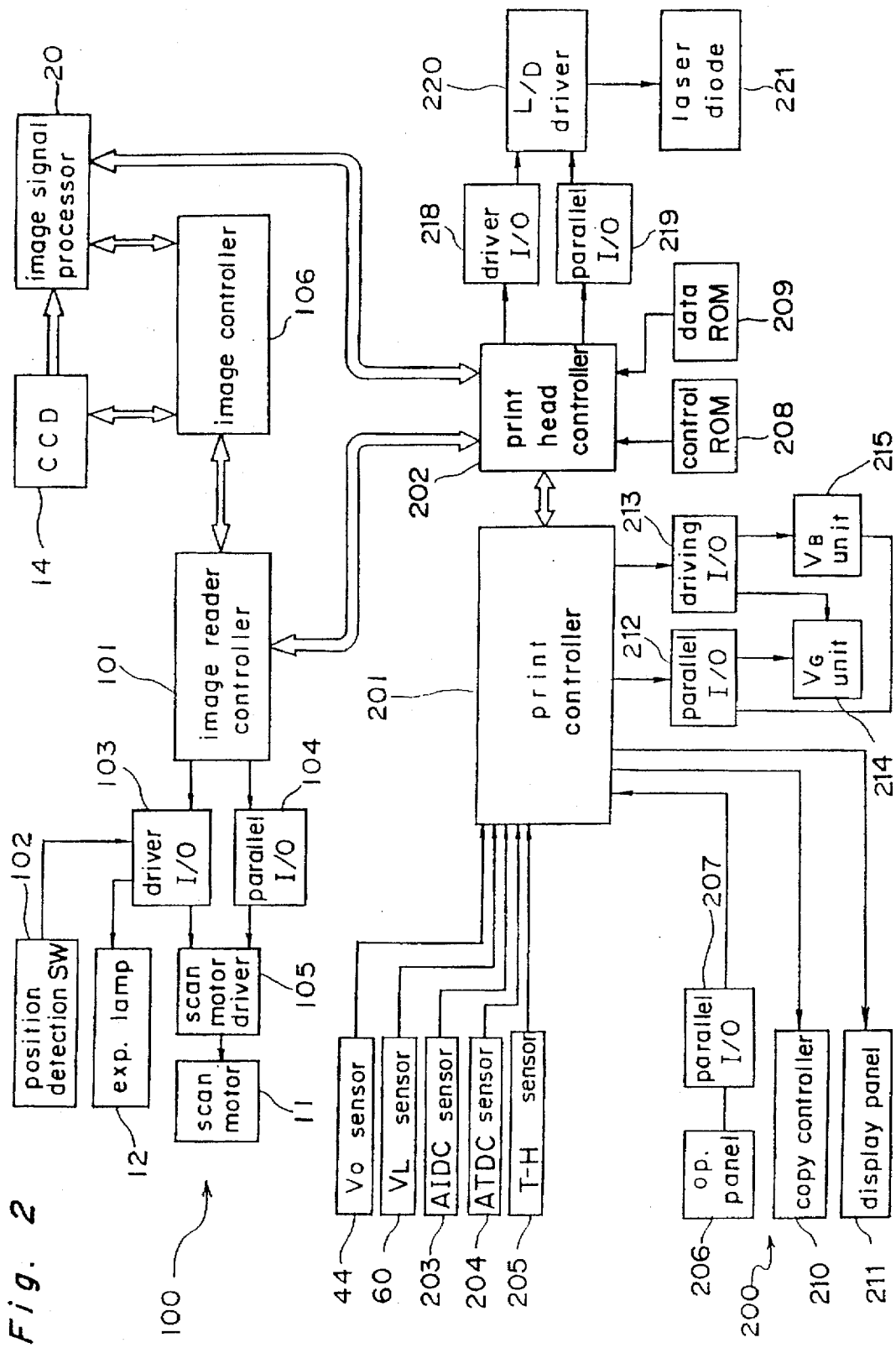
FIG. 2 is a block diagram of the control system of the digital color copying machine.

FIG. 2 shows a whole block diagram of a control system of the digital color copying machine of the embodiment of the present invention.

The image reader part 100 is controlled by an image reader controller 101, which controls the exposure lamp 12 via a driver input/output (I/O) device 103 according to the position signal from a position detection switch 102 which shows the position of a document on the platen 15. The image reader controller 101 also controls a scan motor driver 105 via the driver I/O device 103 and a parallel I/O device 104. The scan motor 11 is driven by the scan motor driver 105.

On the other hand, the image reader controller 101 is connected to an image controller 106 via a bus. The image controller 106 is connected via buses to the CCD color image sensor 14 and an image signal processor 20. An image signal from the image sensor 14 is supplied to the image signal processor 20 for the processing to be explained later.

The print part 200 has a print controller 201 for controlling print action and a print head controller 202 for controlling the print head unit 31. The print controller 201 has a CPU for print control. The print head controller 202 is connected to a control read-only-memory (ROM) 208 storing a program for control and to a data ROM 209 for storing various kinds of data such as gamma correction data.

The print controller 201 receives analog signals from various sensors: a $V_O$ sensor 44 for detecting the surface electrical potential of the photoconductor drum 41 before exposure a $V_L$ sensor for detecting the surface electric potential after exposure, the AIDC sensor 203 for detecting optically the amount of the adhered toners of a standard toner image formed on the photoconductor drum 41, an ATDC sensor 204 for detecting the toner density in the development units 45a–45d, temperature and humidity sensors 205. Various data can be inputted to the print controller 201 via the parallel I/O device 207 by a key-input with the operational panel 206.

The print controller 201 controls a copy controller 210 and a display panel 211 according to the data obtained from the sensors 44, 60, 203–205, the operational panel 206, and the data ROM 209, while controls a high voltage ($V_G$) unit 214 for generating the grid electric potential $V_G$ of the sensitization charger 43 and a high voltage ($V_B$) unit 215 for generating the development bias voltage $V_B$ of the development units 45a–45d via a parallel I/O device 212 and a driver I/O unit 213 in order to control the density automatically with the AIDC sensor 203 or manually with a key-input in the operational panel 206.

Further, the print controller 201 is connected via an image data bus to the image signal processor 20 of the image reader part 100, while it controls a laser diode (I/O) driver 220 via a driver I/O device 218 and a parallel I/O device 219 by referring the contents of the data ROM 209 storing the data for gamma correction. A laser diode 221 is driven by the driver 220 for emitting a laser beam. The expression of gradation can be performed by the modulation of the intensity of a laser beam emitted by the laser under a constant pulse width. (In some embodiments, the gradation is expressed by using pulse width modulation method under a constant intensity of light (refer section (d-6).)

(b) processing of image signal

Figure 3:
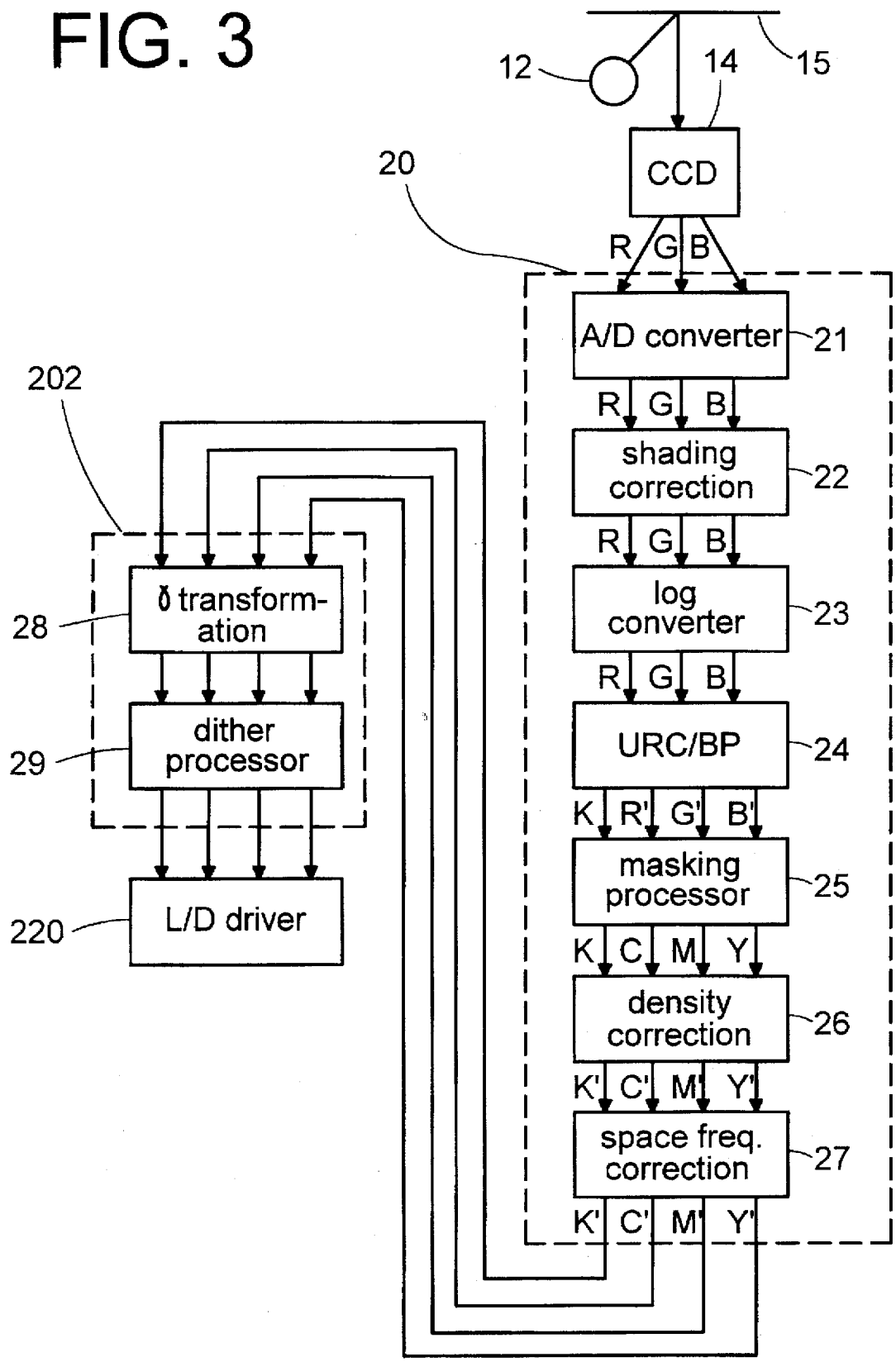
FIG. 3 is a block diagram of the control system of the digital color copying machine.

FIG. 3 shows a flow of the processing of image signal from the CCD color image sensor 14 via the image signal processor 20 to the print controller 201. By referring FIG. 3, the processing, of an output signal received from the CCD color image sensor 14 is explained.

In the image signal processor 20, an image signal obtained by the CCD color image sensor 14 by using the photoelectric properties is converted to a multi-level digital image data of R, G, B by an analog-to-digital converter 21. The image data converted is corrected for shading by a shading correction circuit 22. The image data corrected is converted to density data of an actual image by using a log conversion with a log conversion circuit 23. Further, the density data is processed by a UCR/BP (undercolor remove/black paint) circuit 24 to remove unnecessary black coloring and to generate a true black data K from the R, G, B data, and then the data R, G, B of the three colors, red, green and black, are transformed into data Y, M, C of the three colors of yellow, magenta and cyan by the masking processor circuit 25. A density correction circuit 26 processes density correction by multiplying predetermined coefficients to the Y, M, C data transformed as describe above, and then a space frequency correction circuit 27 performs the space frequency correction on the data processed by the density correction circuit 26. Finally, the data of each color are supplied to the print head controller 202 as a multi-level density data of level 0–255.

In the print head controller 202, a gamma transformation part 28 performs the gamma transformation of an image signal received from the image processor 20, according to a transformation table for gamma correction stored in the data ROM 217. Then, if the multi-level dither method is adopted, a dither processor 29 performs dither processing according to dither threshold value data stored in the data ROM 209. Then, the output signal is sent to the laser diode driver 220.

FIG. 4 shows a block diagram of image data processing in the print head controller 202, wherein an image data (8-bit data for each color) is supplied from the image signal processor 20 via an interface 251 to the first-in-first-out memory (hereinafter referred to as FIFO memory) 252, which is a line buffer memory having a capacity of a predetermined number of lines in the main scan direction. The FIFO memory 252 is used to absorb the difference between clock frequencies of the image reader part 100 and the printing part 200. A data of the FIFO memory 252 is supplied to a gamma correction part 253, while gamma correction data is sent to the gamma correction part 253 by the print controller 201 as will be explained later. (This part 253 includes the two parts 28 and 29 shown in FIG. 3.) Then, the gamma correction part 253 corrects the input data (ID) to supply an output level to a digital-to-analog converter 254, which converts the output level (a digital value) to an analog electric voltage. This analog electric voltage is amplified by a gain change circuit 255 according to a gain set value received through a gain change signal generator 256 from the print controller 201 for changing switches $SW_1$–$SW_8$ in correspondence with different powers $P_1$–$P_8$, and then the amplified voltage is sent via a driver I/D device 218 to a laser diode driver 220 so as to make the laser diode 221 emit a laser beam of an intensity (or of a pulse width in modified embodiments) according to the amplified voltage. The print controller 201 sends a clock signal via a parallel I/O device 219 to the laser diode driver 220.

Figure 16:
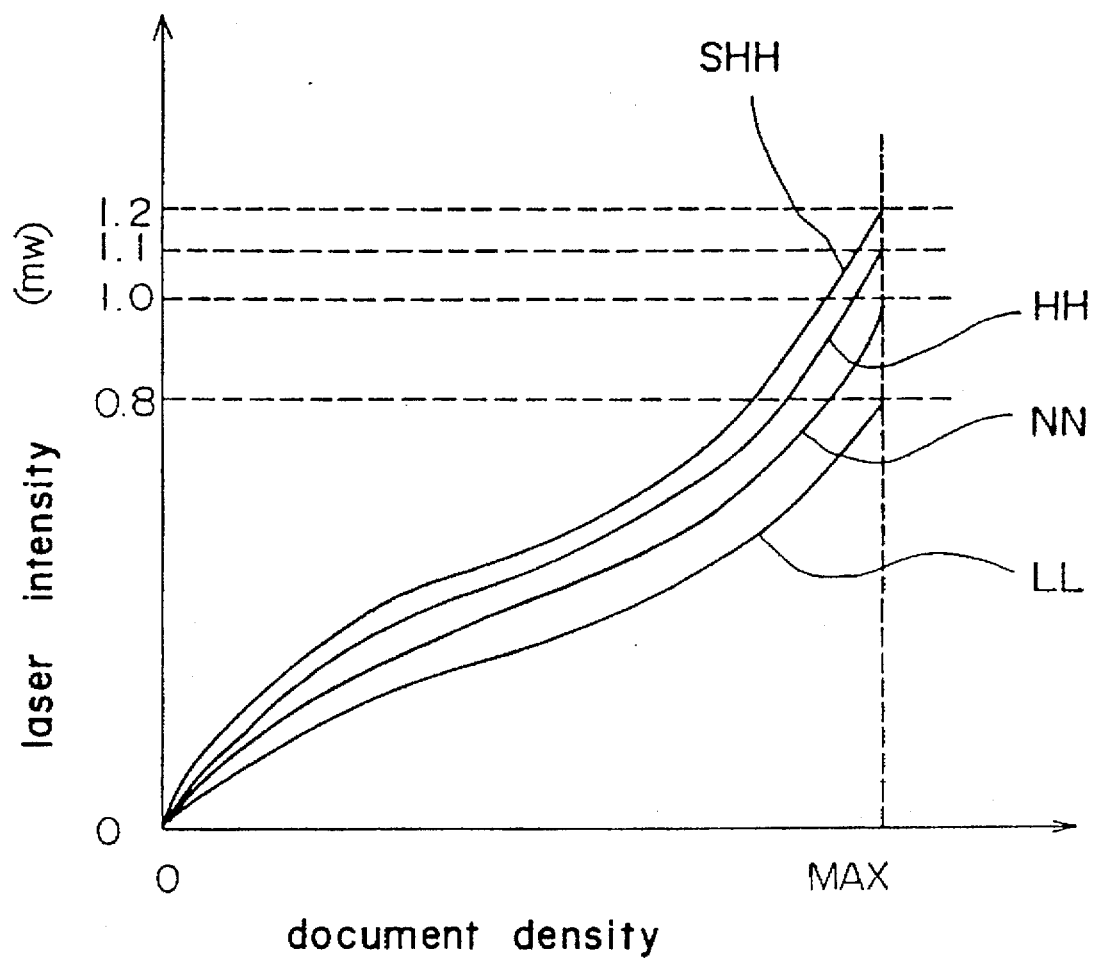
FIG. 16 is a graph of the laser intensity plotted against document density at four environmental conditions.

In the explanation of the present invention, such statement that "the maximum intensity is changed" or "the maximum intensity is selected" is used for simplicity. However, in such cases, not only the maximum intensity but also laser intensities at intermediate densities are also changed practically, as shown in FIG. 16.

The analog-to-digital converter 254 and the gain change circuit 255 and the gain change signal generator 256 may be installed in the laser diode driver 220. In this case, an image digital signal received from the print head controller 203 is processed similarly as explained above. According to a gain set value received from the print controller 201. The gain set value is determined according to detection signals of sensors 44, 60, 203–205 and key-inputs of the operational panel 206.

In this example, an analog image signal is amplified according to the gain set value.

However, the pulse width of laser beam emitting or the driving current of the laser diode 221 may be changed according to the gain set value.

(c) methods for expressing gradation

The multi-level exposure method and the multi-level dither method are used in the embodiments of the present invention for expressing gradation.

Multi-level exposure method includes the intensity modulation method and the pulse width modulation method. First, the intensity modulation method will be explained below.

In the intensity modulation method, the density of a dot to be printed is changed at multi-levels. The intensity of laser beam for a constant light-emitting time is digitized at multi-levels according to the multi-level signal from an image reader, and a light amount varing with the multi-level signal exposes the photoconductor so that the density of a dot is digitized.

Figure 5:
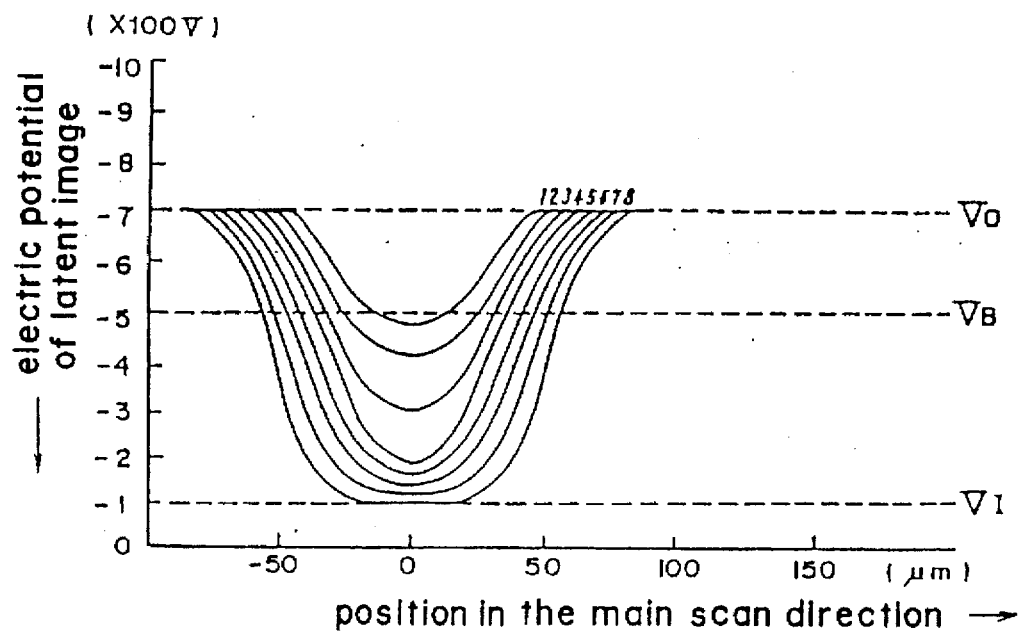
FIG. 5 is a graph of the electric potential of electrostatic latent image of a dot formed by modulating the intensity of laser beam at eight levels designated by numerals.

FIG. 5 shows a schematic sectional view of electric potential of the electrostatic latent image of a dot formed by exposing the photoconductor at eight levels designated by numerals. Thus, the gradation can be expressed as a change in the amount of the adhered toners or in image density.

Next, the pulse width modulation method will be explained below, wherein the area of a dot to be printed is modulated. The light-emitting time of laser beam under a constant intensity of laser beam is digitized at multi-levels according to a multi-level signal received from an image reader, and the laser beam exposes the photoconductor for a light-emitting time varying with the multi-level signal. Thus, the area of a dot can be changed at multi-levels.

Figure 6:
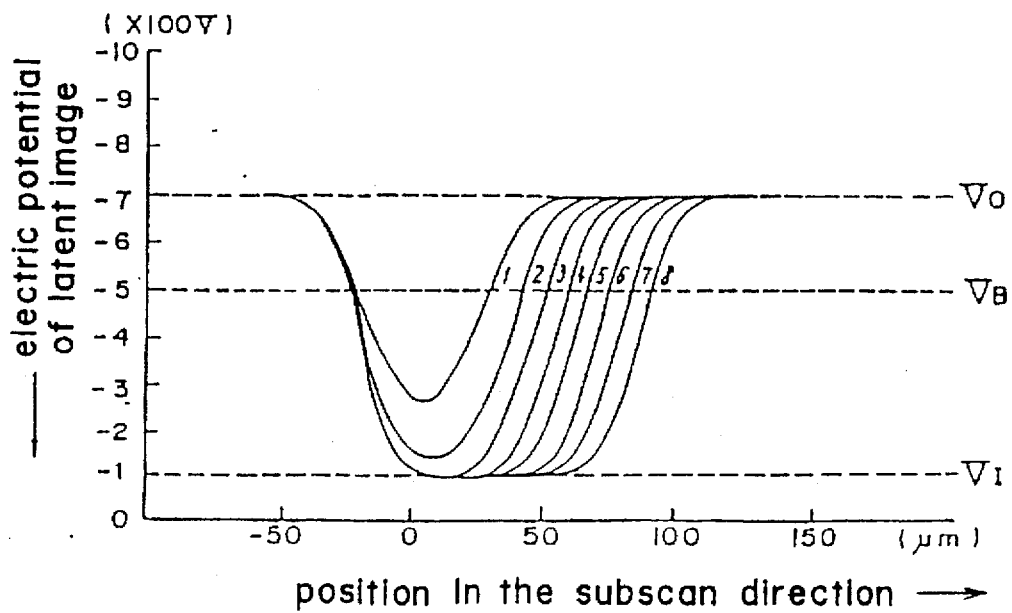
FIG. 6 is a graph of a schematic sectional view of electric potential of a dot of an electrostatic latent image when the light-emitting time of the laser beam of 1.0 mW is changed at eight levels designated by numerals.

FIG. 6 shows a schematic sectional view of electric potential of a dot of an electrostatic latent image when the light-emitting time of the laser beam of 1.0 mW intensity is changed at eight levels. Thus, the area of latent image is changed at multi-levels, so that the gradation is expressed as a change in the area to be adhered by toners or in the area of reproduced image.

Finally, the multi-level dither method will be explained below, wherein the dither method is combined with the above-mentioned multi-level exposure method (the intensity or pulse width modulation method). In this method, a block consists of for example (N×M) dots, and each dot in a block is digitized at multi-levels (for example L), so that the gradation of (N*M*L+1) levels can be expressed, and each dot is digitized by using the above-mentioned intensity or pulse width modulation method. Thus, a block of (N*M) dots is a pixel in the multi-level dither method, whereas a dot is a pixel in the intensity or pulse-width method.

Figure 7:
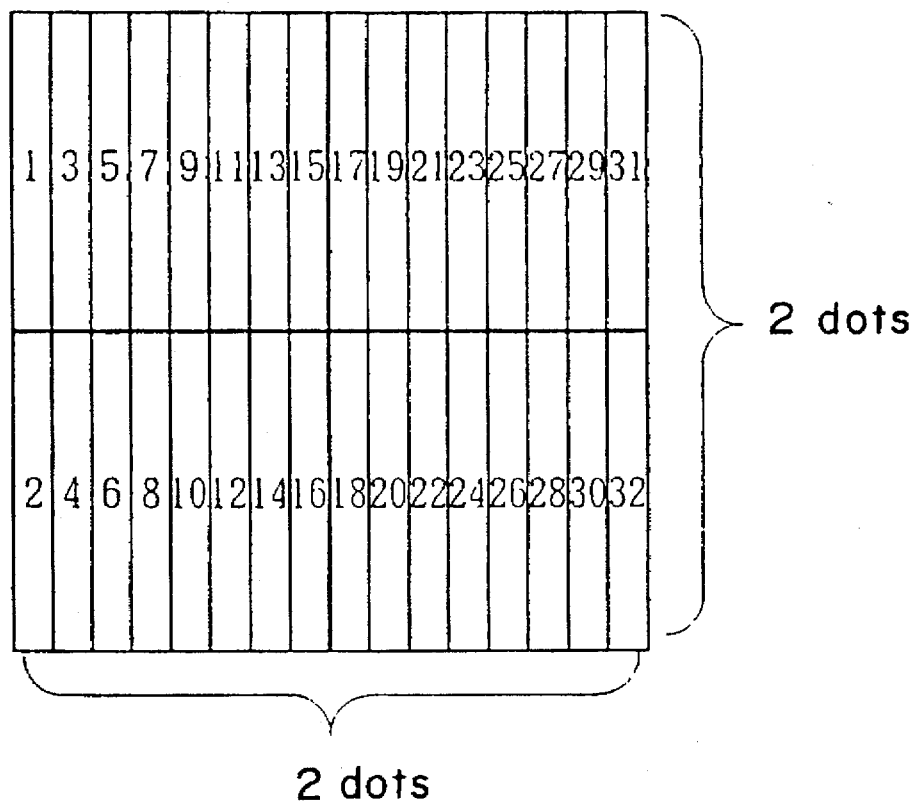
FIG. 7 is a graph of a (2×2) multi-level dither matrix wherein numerals 1–32 represents threshold values.

FIG. 7 shows an example of a block of (2*2) dots, each dot being digitized at eight levels. Thus, this dither method can express the gradation of (2*2*8+1)=33. Though the threshold values are expressed as numerals 1–32 in FIG. 6 as strips for convenience even if the gradation is expressed by modulating the intensity.

(d) image density control and gradation characteristic

In the present invention, a change in gradation characteristic caused by the density control is compensated so that an image can always be reproduced with certain gradation characteristic. Before explaining embodiments of the present invention, the image density control process used previously will be explained first.

Figure 8:
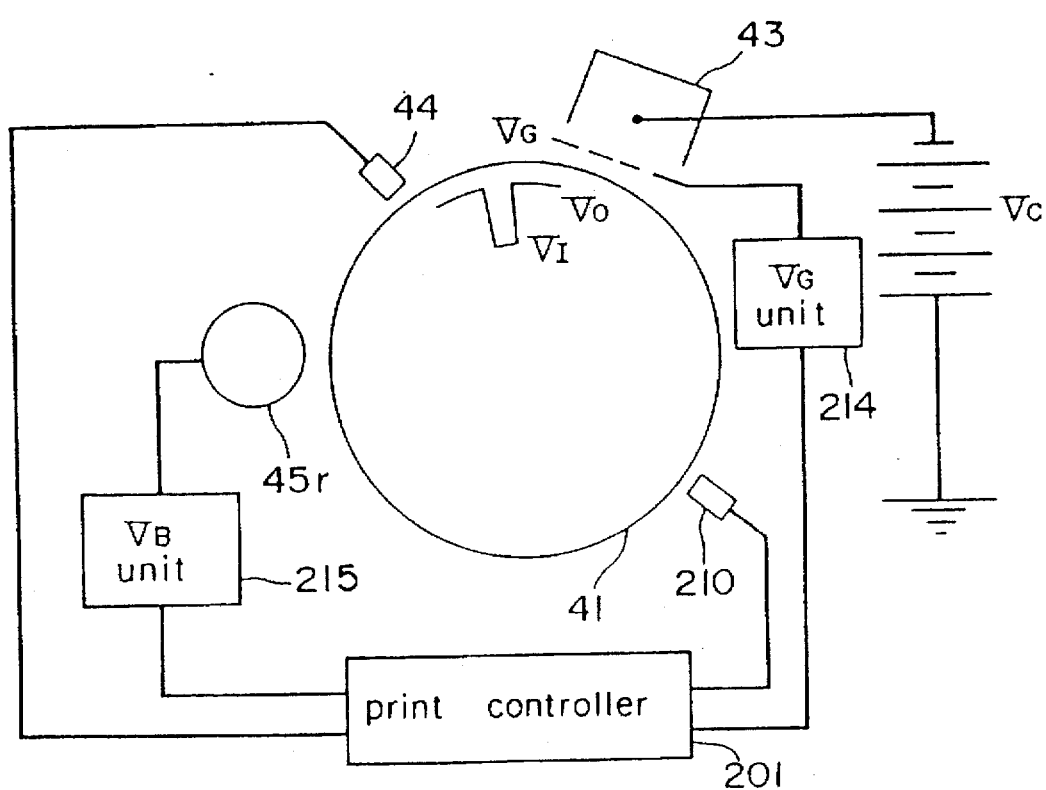
FIG. 8 is a schematic diagram for explaining the image density control.

FIG. 8 shows a schematic diagram of an image forming portion including a photoconductor drum 41, having a photoconductor layer, a sensitizing charger 43 and a roller 45r of a development unit. The sensitizing charger 43 of discharge electric voltage $V_C$ is located opposite to the photoconductor drum 41, and a grid electric voltage $V_G$ is applied to the grid of the sensitizing charger 43 through a grid electric voltage generator unit 214. The electric voltage $V_O$ of the surface of the photoconductor drum 41 sensitized by the sensitizing charger 43 is controlled by changing the grid electric potential $V_G$ according to the detected value of the electric voltage $V_O$ by a $V_O$ sensor 44.

Before the exposure of the photoconductor with a laser beam, a negative surface electric potential $-V_O$ is applied to the photoconductor drum 41 by the sensitizing charger 43, while a negative development bias electric voltage $V_B$ of smaller absolute value ($|V_O|>|V_B|$) is applied to the development unit roller 45r through a development electric voltage generator unit 215 for preventing fog phenomenon. That is, the surface electric potential of development sleeve is also $V_B$.

The exposure of photoconductor with laser beam lowers the electric potential $V_L$ of the photoconductor from the surface electric potential down to the electric potential $V_I$ at the exposure with the maximum quantity of light. When the electric potential $V_L$ of an electrostatic latent image formed in the photoconductor becomes lower than the development bias electric voltage, toners adhere onto the photoconductor drum 41. The amount of adhered toners increase with increase in the difference between $V_B$ and $V_L$. Thus, by changing the surface electric potential $V_O$ and the development bias voltage $V_B$, the amount of adhered toners can be changed according to the difference between $V_B$ and $V_L$ so as to control the image density.

In this type of image density control process, the maximum density is kept constant by changing $V_O$ and $V_L$ manually or automatically. First, a standard toner image is formed as a standard for image density control on the surface of the photoconductor drum 41, and an AIDC sensor 203 located near the photoconductor drum 41 detects the quantity of reflecting light from the standard toner image. The value detected by the AIDC sensor 203 is sent to a print controller 201, which compares the detected value by the AIDC sensor 203 with a predetermined value and drives the $V_G$ generator unit 214 and the $V_B$ generator unit 215 according to the comparison result. This process is repeated until the amount of adhered toners reaches a predetermined value.

Figure 9:
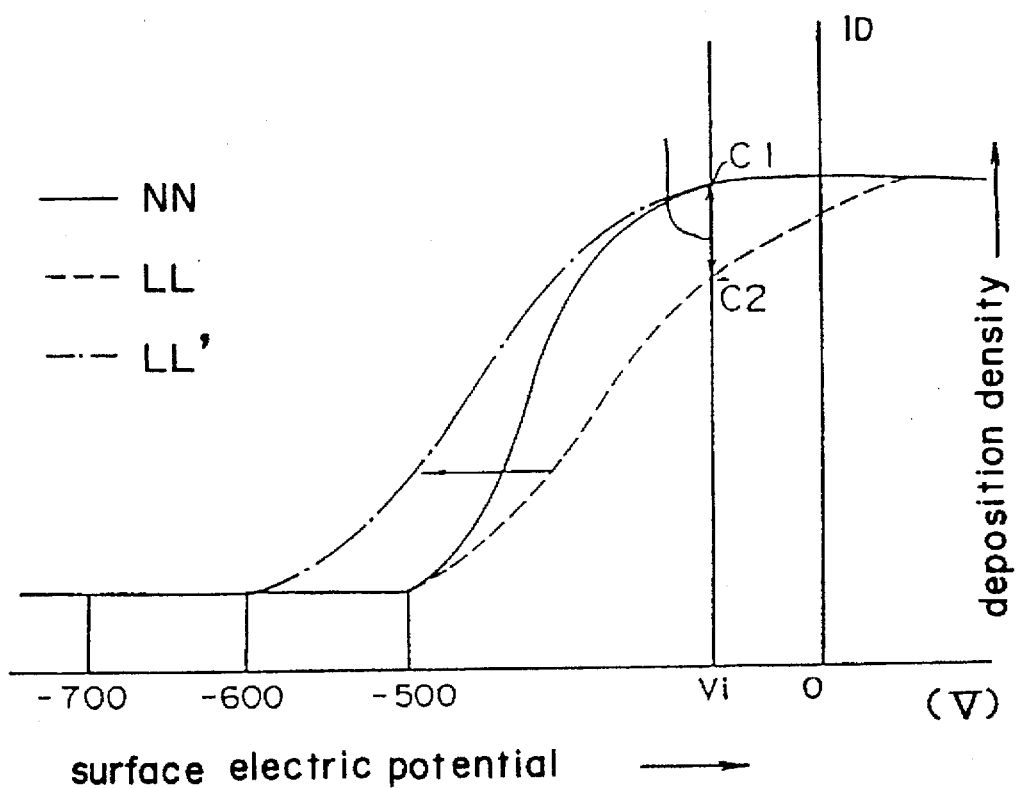
FIG. 9 is a graph of development characteristic at different environments.

Such control of the surface electric potential $V_O$ and the development bias electric voltage $V_B$ so as to make the maximum image density constant may affect the gamma characteristic in largely, as shown for example in FIG. 9.

FIG. 9 shows a graph of development characteristics the standard environment NN and in the low-temperature low-humidity environment LL, wherein a solid line and a dashed line represent the development characteristics in the standard environment and in the low-temperature low-humidity environment, respectively.

The electric voltages $V_O$ and $V_B$ are set to be ($V_O$, $V_B$)=(−700 V, −500 V) in the standard environment, while the maximum laser intensity for exposure is 1.0 mW. If the environment is changed to the low-temperature low-humidity conditions under the electric voltage set values, the development characteristic in the standard environment NN fluctuates to that in the low-temperature low-humidity environment designated by LL' and the maximum image density defined as a cross between the development characteristic curve and the surface electric potential $V_I$ of the photoconductor decreases from C1 to C2. Thus, the density of a reproduced image becomes lower if the environment is changed to the low-temperature low-humidity condition. Therefore, the image density has to be controlled to compensate such a change.

Then, let us assume that electric voltages $V_O$ and $V_B$ are changed to ($V_O$, $V_B$)=(−800 V, −600 V) in order to keep the maximum image density constant when the environment is changed to the low-temperature low-humidity condition LL. Then, the development characteristic shifts to the development characteristic LL' as shown by a dot-dashed line in FIG. 9. Thus, the cross with the surface electric potential $V_I$ agrees with C1 in the standard environment. However, as shown in FIG. 9, the shape of development characteristic LL' corrected for the low-temperature low-humidity environment differs much from that NN in the standard environment, so that the gamma characteristic changes largely by the correction. Similar situation arises when the environment is changed to high-temperature high-humidity condition. In such a case, the electric voltages have to be set to be as low as for example ($V_O$, $V_B$)=(−600 V, −400 V) so as to keep the maximum image density constant, but the gamma characteristic changes largely by the correction.

Figure 10:
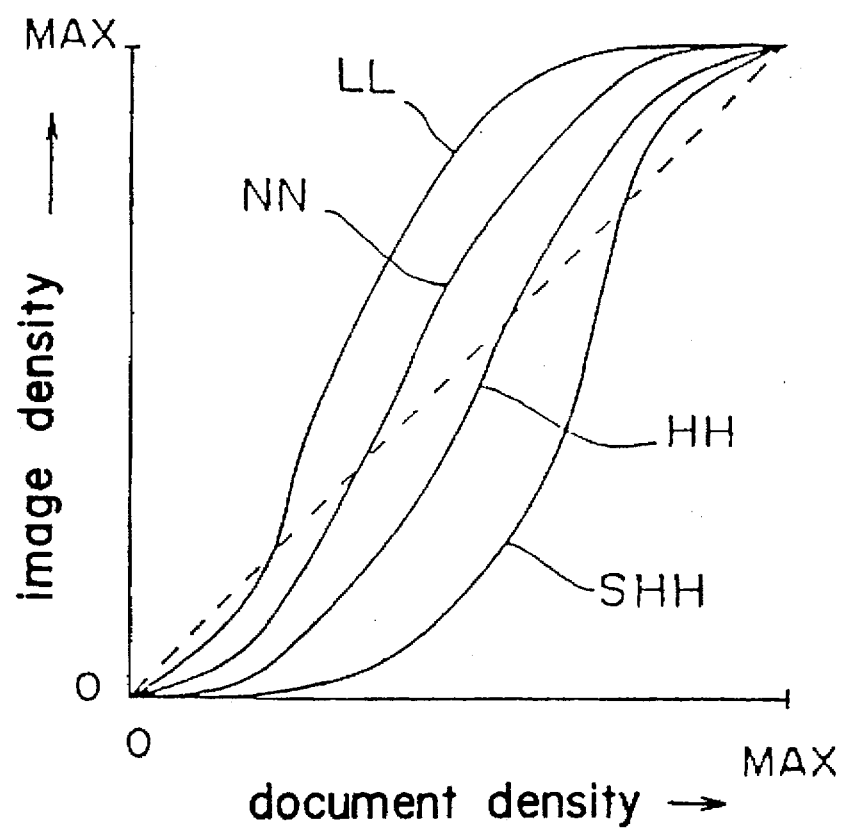
FIG. 10 is a graph of the gamma characteristic in the standard environment and those in other environments corrected for image density.

FIG. 10 shows the gamma characteristics in the low-temperature low-humidity environment LL, in the high-temperature environment HH, and in the higher-temperature higher-humidity environment SHH, respectively, after compensated for keeping the maximum image density constant, as well as that in the standard condition NN.

Figure 11:
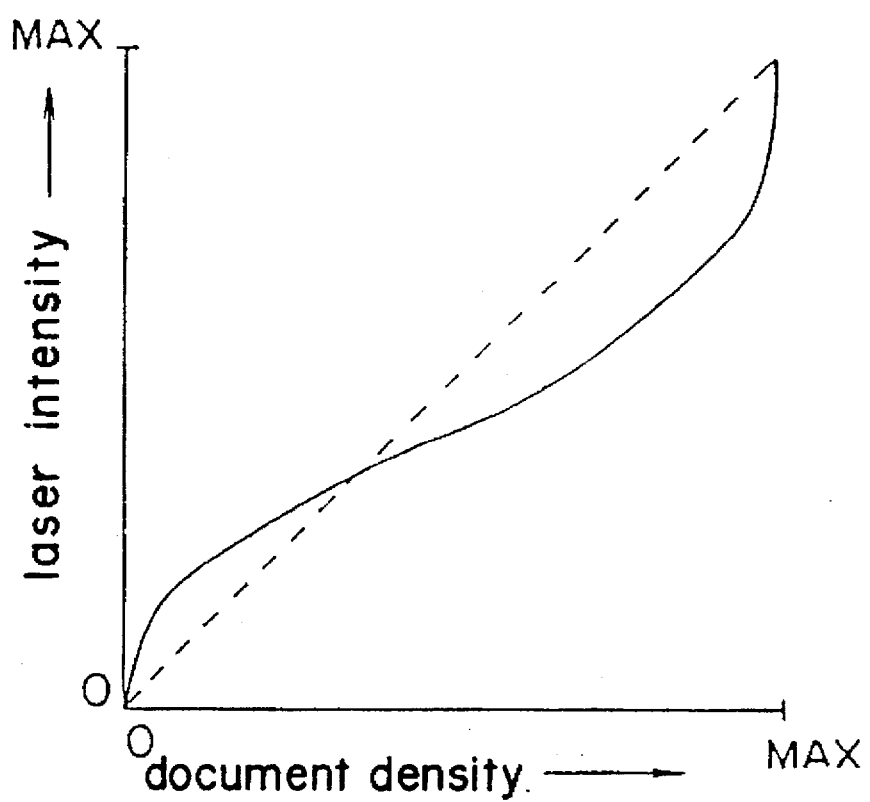
FIG. 11 is a graph of the light-emitting characteristic wherein the light intensity is changed nonlinearly with a transformation table for gamma correction so as to change the gamma characteristic linearly in the standard environment.
Figure 12:
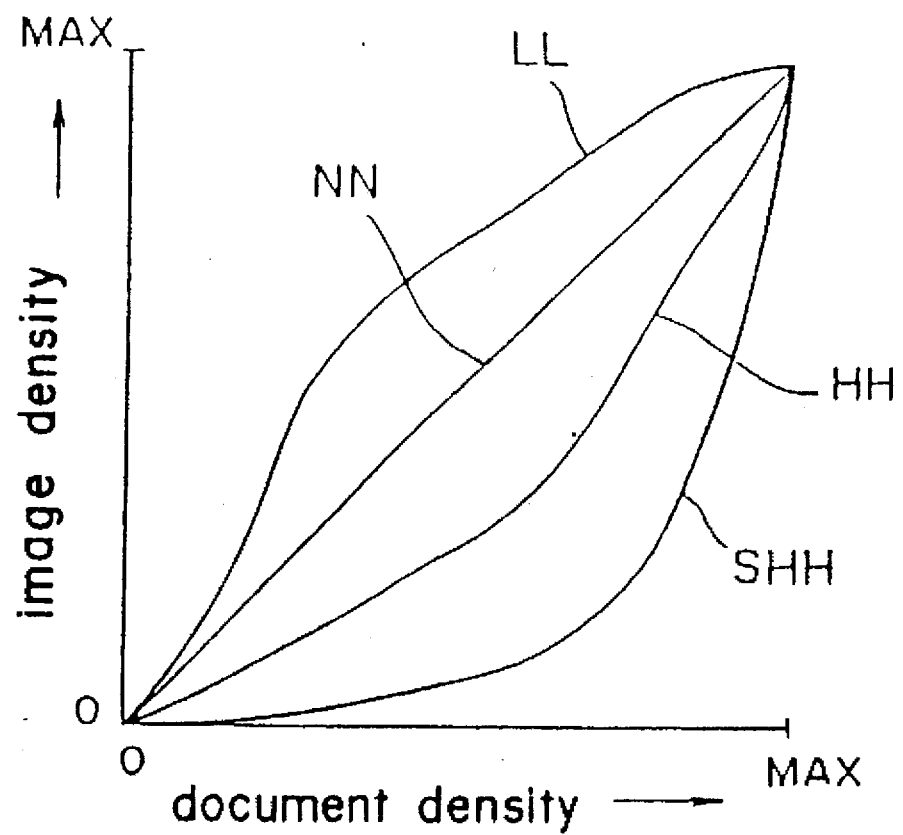
FIG. 12 is a graph of gradation characteristics for four cases of FIG. 10 corrected with use of a laser of the light-emitting characteristic in the standard environment NN shown in FIG. 10.

On the other hand, previously the light-emitting intensity of laser beam is controlled by using a transformation table for gamma correction, as shown in FIG. 11, in correspondence with the gamma characteristic in the standard environment NN shown in FIG. 10. However, as shown in FIG. 12, such gamma correction with use of a single transformation table is not good except in the standard environment.

The change in the gamma characteristic shown in FIG. 10 is caused by changes in the surface electric potential $V_O$ and the development bias electric voltage $V_B$. On the other hand, the gamma characteristic is also affected by laser intensity, as will be explained below.

Figure 13:
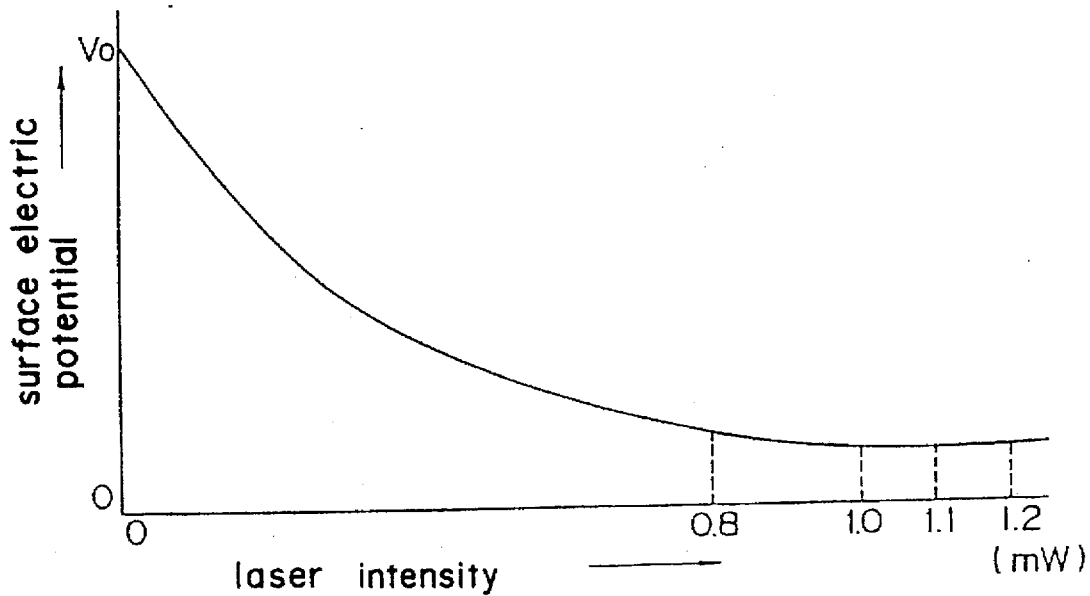
FIG. 13 is a graph of the surface electric potential plotted against the intensity of laser beam under a constant light-emitting time.

FIG. 13 shows a change in the surface electric potential when the sensitized photoconductor is exposed with a laser beam of a variable laser intensity in a constant light-emitting time. It is apparent that when the laser intensity is changed, the surface electric potential saturates after it decreases to a certain degree, at which point the image density does not change much. Four values 0.8, 1.0, 1.1 and 1.2 mW correspond to the maximum laser intensity to keep the maximum image density constant.

Figure 14:
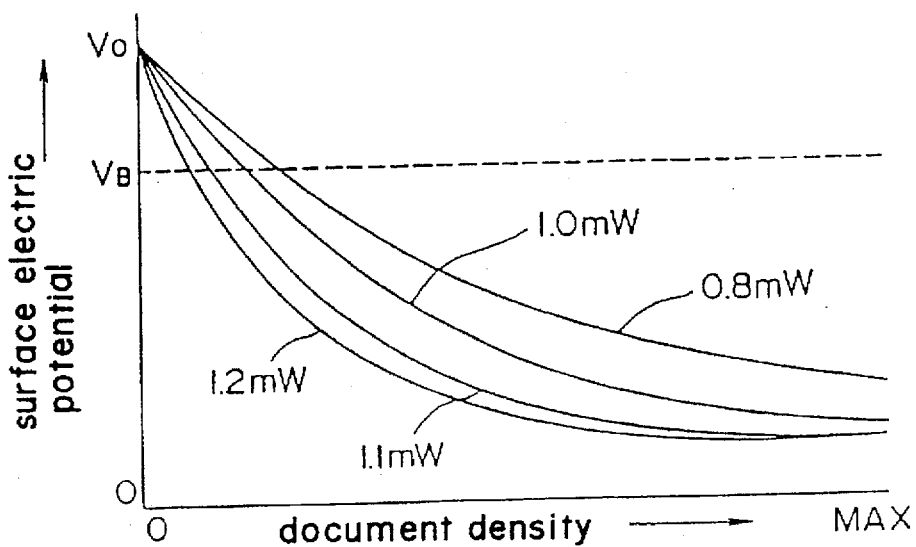
FIG. 14 is a graph of the surface electric potential plotted against the intensity of laser beam wherein the maximum intensity is 0.8, 1.0, 1.1 and 1.2 mW.
Figure 15:
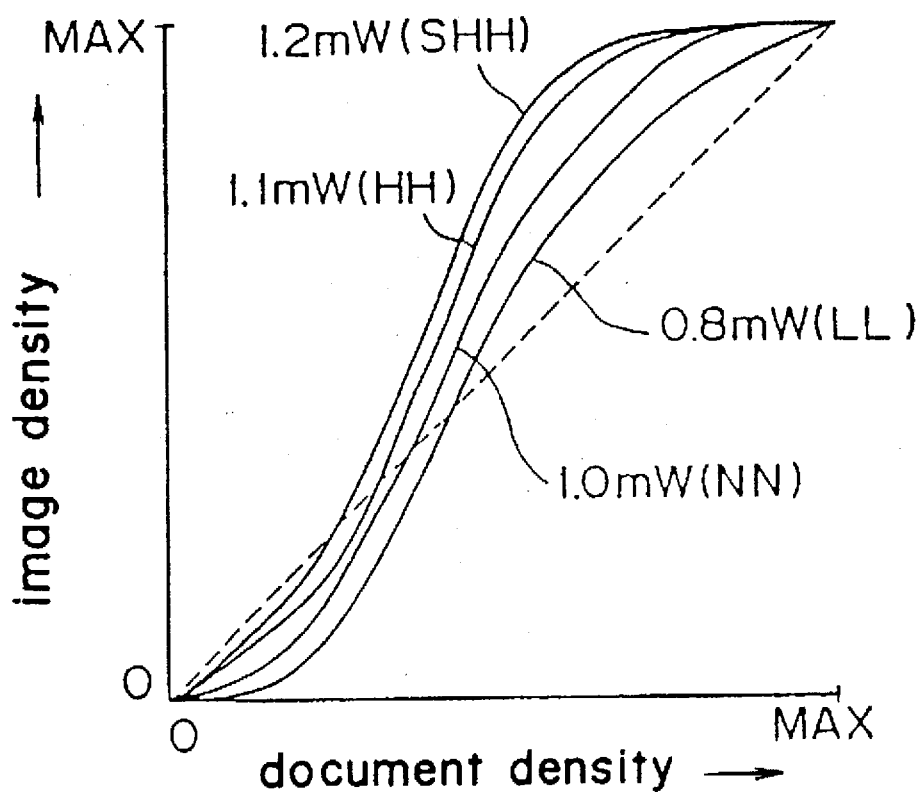
FIG. 15 is a graph of gamma characteristics in the four environmental conditions of FIG. 10 so as to realize the gradation characteristic of NN.

On the other hand, FIG. 14 shows the surface electric potential when the laser intensity is increased each of maximum values of 0.8, 1.0, 1.1 and 1.2 mW over an identical light-emitting time. FIG. 15 shows the gamma characteristic (the relation of image density with document) by taking the development characteristic into account for the data of FIG. 14. Thus, the gamma characteristic is also found to vary with laser intensity.

Then, in the present invention, the image density is controlled by changing the surface electric potential $V_O$ and/or the development bias electric voltage $V_B$ while the laser intensity is changed so as to realize the ideal gradation characteristic by compensating a change in the gamma characteristic due to the change in $V_O$ and $V_B$.

FIG. 16 shows the laser intensity in the four environments LL, NN, HH and SHH plotted against document density level from zero to the maximum (MAX). That is, the surface electric potential and/or the development bias electric voltage is controlled according to the environment so as to keep the maximum density constant, while not only the maximum laser intensity but also the laser intensity in the whole gradation area is controlled to compensate a change in gradation characteristic. For example, in this embodiment, a set of the surface electric potential $V_O$ and the development bias electric voltage $V_B$ is selected for each environment in order to keep the maximum image density constant. That is, $(V_O, V_B)$ is (−800 V, −600 V) for the low-temperature low-humidity environment LL, (−700 V, −500 V) for the standard environment NN, (−600 V, −400 V) for the high-temperature high-humidity environment HH and (−500 V, −300 V) for the higher-temperature higher-humidity condition SHH. If the laser beam intensity is kept constant as 1.0 mW irrespective of $(V_O, V_B)$, the gradation characteristic is not constant as shown in FIG. 10. Thus, the laser beam intensity P is also changed according to the environment in order to keep the gradation characteristic constant. That is, P is selected to be 0.8 mW for LL, 1.0 mW for NN, 1.1 mW for HH and 1.2 mW for SHH.

Table 1 shows the selected values of $V_O$, $V_B$ and P for the four environments. Thus, for example in the low-temperature low-humidity environment, the gamma characteristic for constant laser intensity, shown as LL in FIG. 10, which rises faster near the origin by changing the maximum laser intensity so that the gamma characteristic for constant $V_O$ and $V_B$ is shifted from the characteristic designated as NN to the characteristic as LL in FIG. 15, which rises milder near the origin, so as to realize the laser intensity characteristic shown in FIG. 11. Similarly, in the high-temperature high-humidity environment HH, the gamma characteristic designated as HH in FIG. 10 is compensated by shifting the constant $V_O$, $V_B$ characteristic from the NN characteristic to that designated as HH in FIG. 15, while in the higher-temperature higher-humidity environment SHH, the gamma characteristic designated as SHH in FIG. 10 is compensated by shifting the NN characteristic to that designated as SHH in FIG. 15 so as to keep the gradation characteristic constant under any environment.

TABLE 17

| environment | $V_O$ (V) | $V_B$ (V) | P (mW) |
| --- | --- | --- | --- |
| LL | −800 | −600 | 0.8 |
| NN | −700 | −500 | 1.0 |
| HH | −600 | −400 | 1.1 |
| SHH | −500 | −300 | 1.2 |

(e) manual density and gradation control

Figure 17:
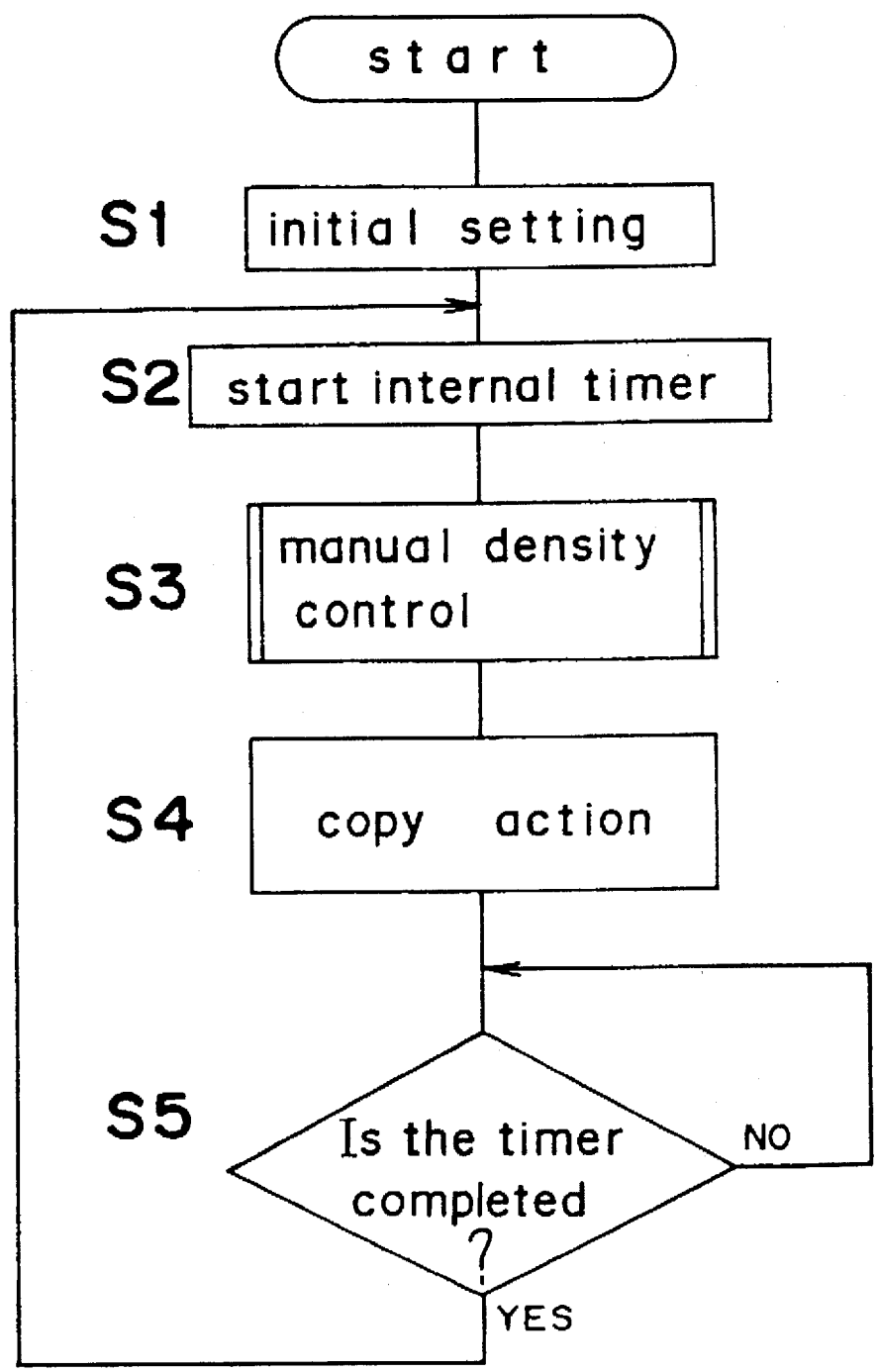
FIG. 17 is a flowchart of the main flow of print control of Example 1.
Figure 18:
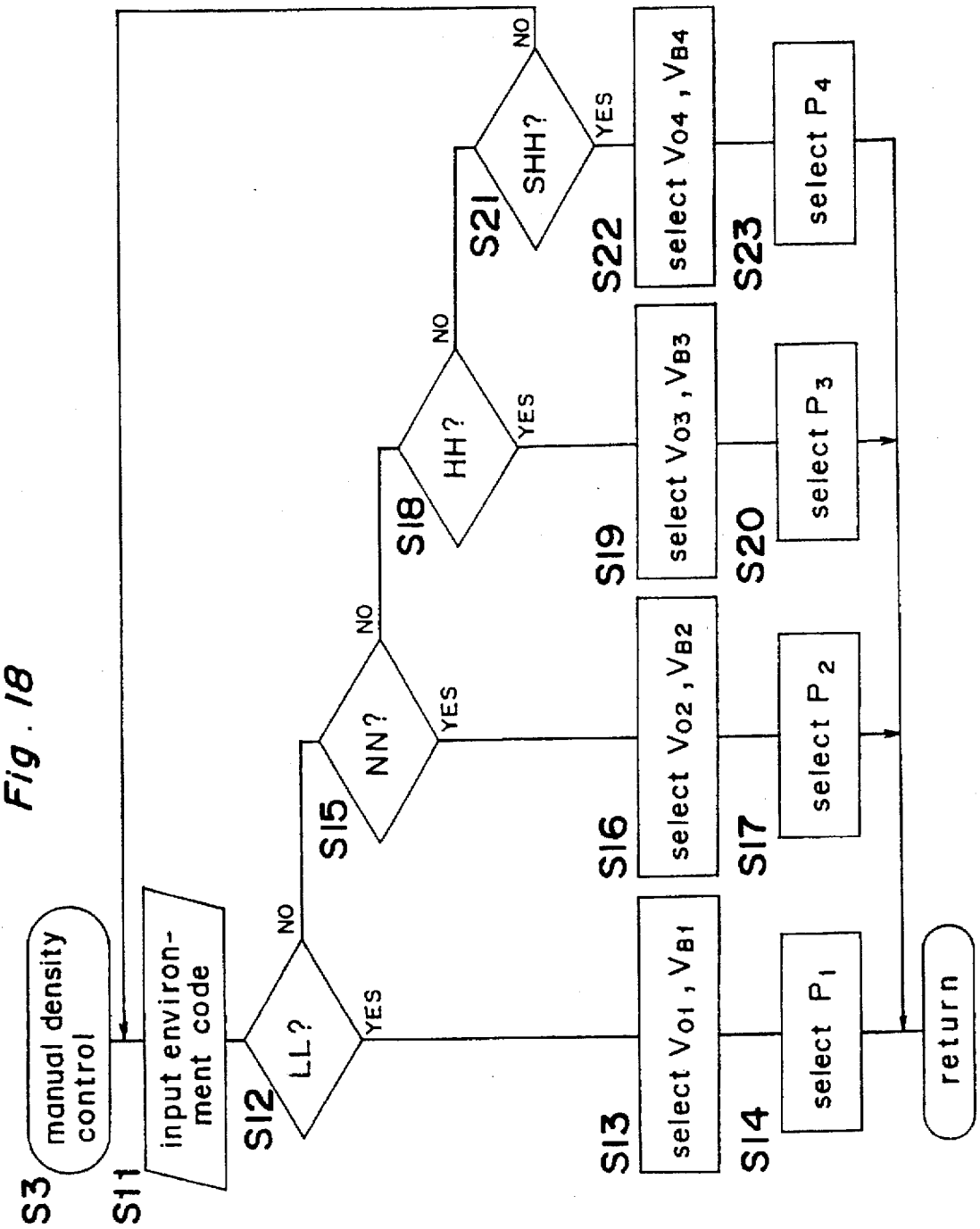
FIG. 18 is a flowchart of the manual density control.

FIGS. 17 and 18 show a flow of control carried out by the print controller 201 of a digital copying machine according to the present invention, wherein a change in density due to the environment is compensated manually.

FIG. 17 shows the main flow of manual density and gradation control. First, the initial setting such as the initialization of parameters is performed (step S1). Next, an internal timer is started (step S2). Then, manual density control is performed, as will be explained below, according to a key-input with the operational panel 206 (step S3). Next, copy action is performed (step S4). After the completion of the timer is detected (YES at step S5), the flow returns to step S2.

FIG. 18 shows the flow of the manual density control (FIG. 17 step S3), wherein the surface electric potential $V_O$ and the development bias electric voltage $V_B$ are selected so as to keep the maximum density by a user according to the environment of the copying machine, while the laser intensity is changed to perform appropriate gamma correction according to the values of $V_O$ and $V_B$ sent to the print head controller 202. In the present example, the environment code has four steps; LL for low-temperature and low-humidity environment, NN for the standard environment, HH for high-temperature and high-humidity environment and SHH for higher-temperature and higher-humidity condition. The laser intensity is changed by controlling the intensity in the intensity modulation method in this example. However, it can also be changed by controlling the pulse width in the pulse width modulation method. Similarly, in the multi-level dither method, the intensity or the pulse width is changed.

First, an environment code is received by a key-input in the operational panel 206 (step S11). A user selects the environment code manually according to temperature and humidity.

If the environment code is decided to be LL (YES at step S12), surface electric potential $V_{O1}$ (in this example −800 V) and development bias electric voltage $V_{B1}$ (in this example −600 V) are selected (step S13) in order to compensate the decrease in the amount of adhered toners when compared with the standard environment. Next, laser intensity P1 (in this example 0.8 mW) is selected (step S14). If the laser intensity is kept constant, the gamma characteristic shown as LL in FIG. 10 is realized according to $V_O$ and $V_B$. Thus, the laser intensity is changed so as to realize the gamma characteristic shown as NN in FIG. 10, Then, the flow returns to the main flow.

If the environment code is decided to be NN (YES at step S21), surface electric potential $V_{O2}$ (in this example −700 V) and development electric voltage $V_{B2}$ (in this example −500 V) are selected (step S22), and laser intensity $P_2$ (in this example 1.0 mW) is selected (step S23). Thus, the light-emitting characteristic, shown in FIG. 10, according to the transformation table for gamma correction shown as NN in FIG. 10 is adopted to realize linear gradation characteristic.

If the environment code is decided to be HH (YES at step S31), surface electric potential $V_{O3}$ (in this example −600 V) and development electric voltage $V_{B3}$ (in this example −400 V) are selected (step S32), and laser intensity $P_3$ (in this example 1.1 mW) is selected (step S33), so as to realize the gamma characteristic in the standard environment. Then, the flow returns to the main flow.

If the environment code is decided to be SHH (YES at step S41), surface electric potential $V_{O4}$ (in this example −500 V) and development electric voltage $V_{B4}$ (in this example −300 V) are selected (step S42), and laser intensity $P_4$ (in this example 1.2 mW) is selected (step S43), so as to realize the gamma characteristic in the standard environment. Then, the flow returns to the main flow.

If the environment code is decided not to be any of the above-mentioned ones (NO at step S41), the flow returns to step S11 to start again.

The laser intensities $P_1$–$P_4$ correspond to transformation tables for gamma correction in order to realize the linear gradation characteristic, and the intensity or the pulse width of laser beam for exposure is controlled according to the selected transformation table.

(f) automatic density and gradation control

In this example, the density is controlled with the AIDC sensor 203 automatically. In other words, the density of a standard toner image formed on the photoconductor is detected by the AIDC sensor 203 as explained before with reference to FIG. 9.

Figure 19:
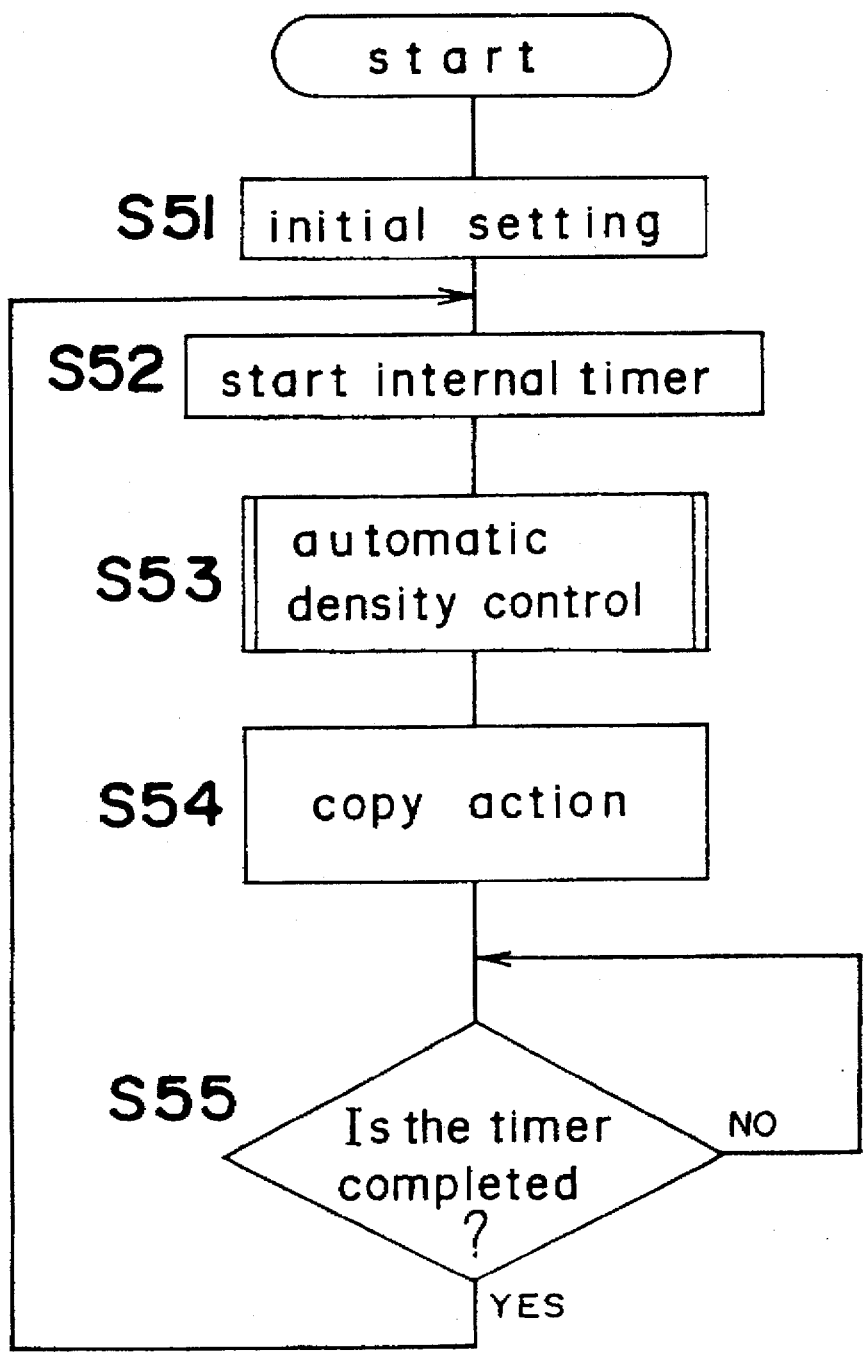
FIG. 19 is a flowchart of main flow of print control of Example 2.

FIG. 19 shows the main flow of automatic density and gradation control. First, the initial setting such as the initialization of parameters is performed (step S51). Next, an internal timer is started (step S52). Then, automatic density control is performed, as will be explained below (step S53). Next, copy action is performed (step S54). After the completion of the internal timer is detected (YES at step S55), the flow returns to step S52.

FIG. 20 shows the flow of automatic density control (FIG. 19 step S53), wherein a change in the density of a standard image due to environmental change is detected automatically to select appropriate values of $V_O$ and $V_B$ while changing the laser intensity for exposure to perform appropriate gamma correction.

First, it is decided if a key-input of the print key is received or not (step S81). If a key input of the print key is received, AIDC flag (F) for performing automatic density control is set to be one (step S82), and the surface electric voltage $V_O$ is set to be $V_{O2}$=−700 V and the development bias electric voltage $V_B$ is set to be $V_{B2}$=−500 V for forming a standard toner pattern on the surface of the photoconductor drum 41 (step S83). Then, the standard pattern is formed with the laser diode emitting at the maximum laser intensity so as to form the maximum density at the setting electric voltages (step S85).

If a key-input of the print key is not detected (NO at step S81), it is decided next if the AIDC flag (F) has been set to be one or not (step S84). If the decision is YES at step S84, the flow proceeds to step S85 and a standard toner pattern is formed by using the electric voltages $V_O$ and $V_B$ selected before. If the decision is NO at step S84, the flow returns to the main flow without performing the automatic control.

Then, it is decided with a timer if the standard toner image arrives at the detection position for the AIDC sensor (step S86). If the decision is YES, the AIDC sensor 203 detects the density of the standard toner image, and the print controller 203 receives the value of the density (step S87), and the flow proceeds to step S88. If it is decided the standard toner image has not yet arrived at the detection position (NO at step S86), the flow returns to the main flow.

At steps S88–S97, the surface electric potential according to the detected density is decided. If the detected density is decided not to be equal to a standard value, the values of $V_O$, $V_B$ are increased or decreased according as the detected density is larger or smaller than the standard value. If the detected density is decided to be equal to a standard value, appropriate laser density is selected for gamma correction.

At step S88, it is decided if the detected density is larger than the standard density. If the detected density is larger than the standard density (YES at step S88), if it is further decided that $V_{O2}$ and $V_{B2}$ have been selected (step S89). If the decision at step S89 is YES, $V_{O2}$ and $V_{B2}$ are selected (step S90). If the decision at step S89 is NO, and while if it is further decided that $V_{O3}$ (=−600 V) and $V_{B3}$ (=−400 V) have been selected (YES at step S91), $V_{O4}$ (=−500 V) and $V_{B4}$ (=−300 V) are selected (step S92). Then, the flow returns to the main flow.

If the detected density is decided not larger than the standard density (NO at step S88), it is decided next if the detected density is smaller than the standard density. If the decision is YES, it is further decided that $V_{O2}$ and $V_{B2}$ has been selected (YES at step S94), $V_{O1}$ (=−800 V) and $V_{B1}$ (=−600 V) are selected (step S95), and the flow returns to the main flow.

If the detection density is neither larger nor smaller than the standard density (NO at steps S88 and S93), it is decided that the detected density is equal to the standard density, and the flow proceeds to step S99 for laser intensity selection, wherein a laser intensity according to the present values of $V_O$ and $V_B$. Then, the AIDC flag (F) is reset to be one (step S97), and the flow returns to the main flow.

In the flow shown in FIG. 15, the electric voltages $V_O$ and $V_B$ are set at four levels. Thus, if the detected density is larger than the standard density even when $V_{O4}$ and $V_{B4}$ which make the density of standard pattern the lowest have been set (NO at step S91), $V_{O4}$ and $V_{B4}$ are allowed to remain at the same values, while $V_{O1}$ and $V_{B1}$ are also allowed to remain at the same values if the detected density is smaller than the standard density even when $V_{O1}$ and $V_{B1}$ which make the density of the standard pattern the largest have been set (NO at step S94), so as to enter the print action. However, if these processing brings inconveniences, the flow can be modified so that the electric voltages $V_O$ and $V_B$ can be set more finely at levels more than four.

FIG. 21 is a flowchart of the selection of laser intensity (FIG. 18 step S96). The laser intensity themselves to be selected in this flow are already explained before with reference to FIG. 18, so that the detailed explanation on them is omitted here.

In the flow, if $V_{O1}$ (=−800 V) is decided to be selected as the surface electric potential of the photoconductor 41 and $V_{B1}$ (=−600 V) is decided to be selected as the development bias electric voltage (YES at step S100), laser intensity $P_1$ for the gamma correction is selected (step S101), for these decisions are the same as the decision that the environment is the low-temperature low-humidity environment LL.

If $V_{O2}$ (=−700 V) is decided to be selected as the surface electric potential and $V_{B2}$ (=−500 V) is decided to be selected as the development bias electric voltage (YES at step S102), laser intensity $P_2$ for the gamma correction is selected (step S103), for these decisions are the same as the decision that the environment is the standard environment NN.

If $V_{O3}$ (=−600 V) is decided to be selected as the surface electric potential and $V_{B3}$ (=−400 V) is decided to be selected as the development bias electric voltage (YES at step S104), laser intensity $P_3$ for the gamma correction is selected (step S105), for these decisions are the same as the decision that the environment is the standard environment HH.

If $V_{O4}$ (=−500 V) is decided to be selected as the surface electric potential and $V_{B4}$ (=−300 V) is decided to be selected as the development bias electric voltage (YES at step S106), laser intensity $P_4$ for the gamma correction is selected (step S107), for these decisions are the same as the decision that the environment is the standard environment SHH.

(g) another embodiment of automatic density and gradation control

The density and the gradation are controlled in an embodiment automatically with use of the AIDC sensor 203. The main flow of this embodiment is similar to that shown in FIG. 19, except that the automatic density control (step S53) is different from that shown in FIG. 20, as will be explained below.

Figure 22A:
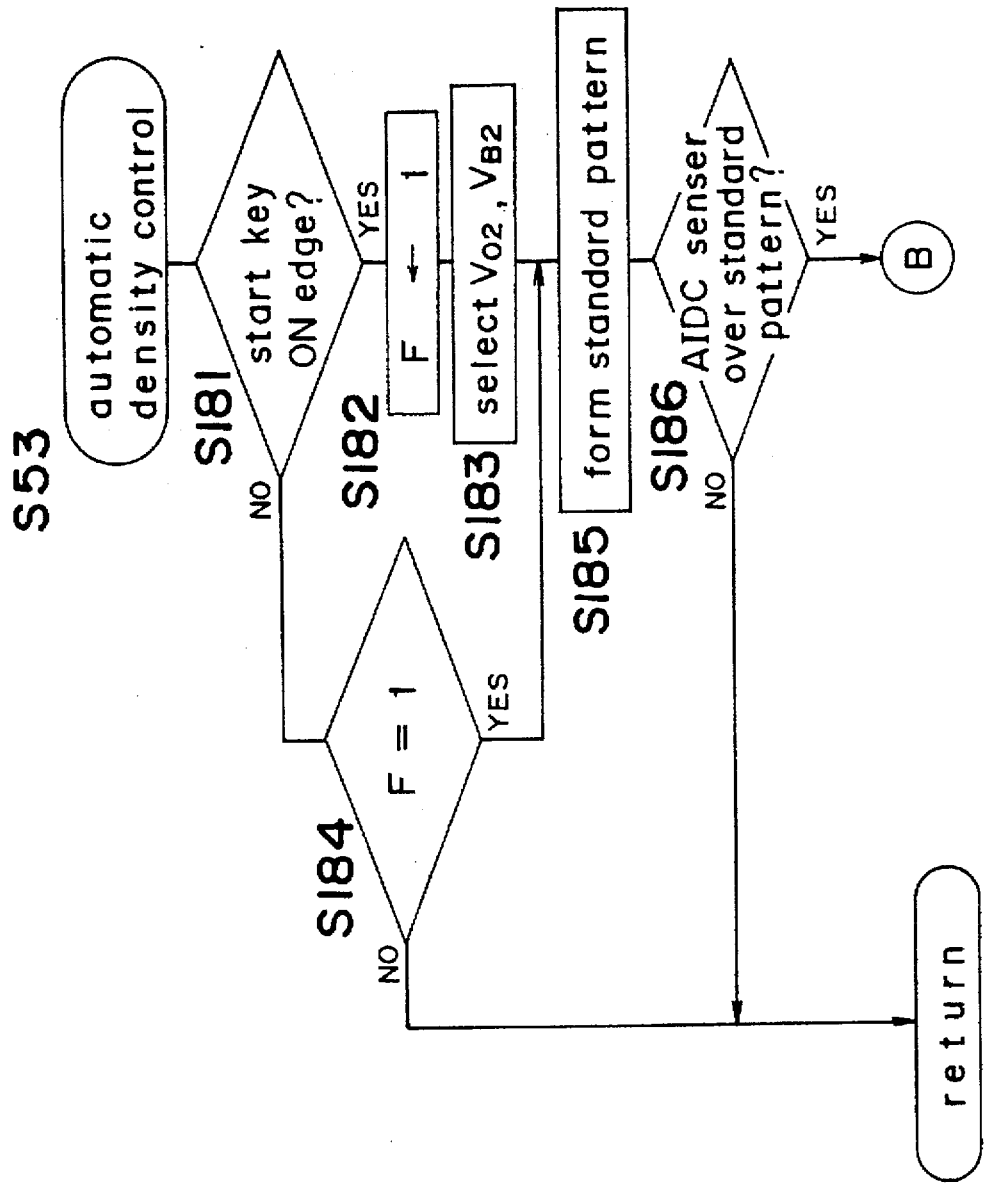
FIGS. 22(a) and 22(b) are flowcharts of another example of automatic density control.
Figure 22B:
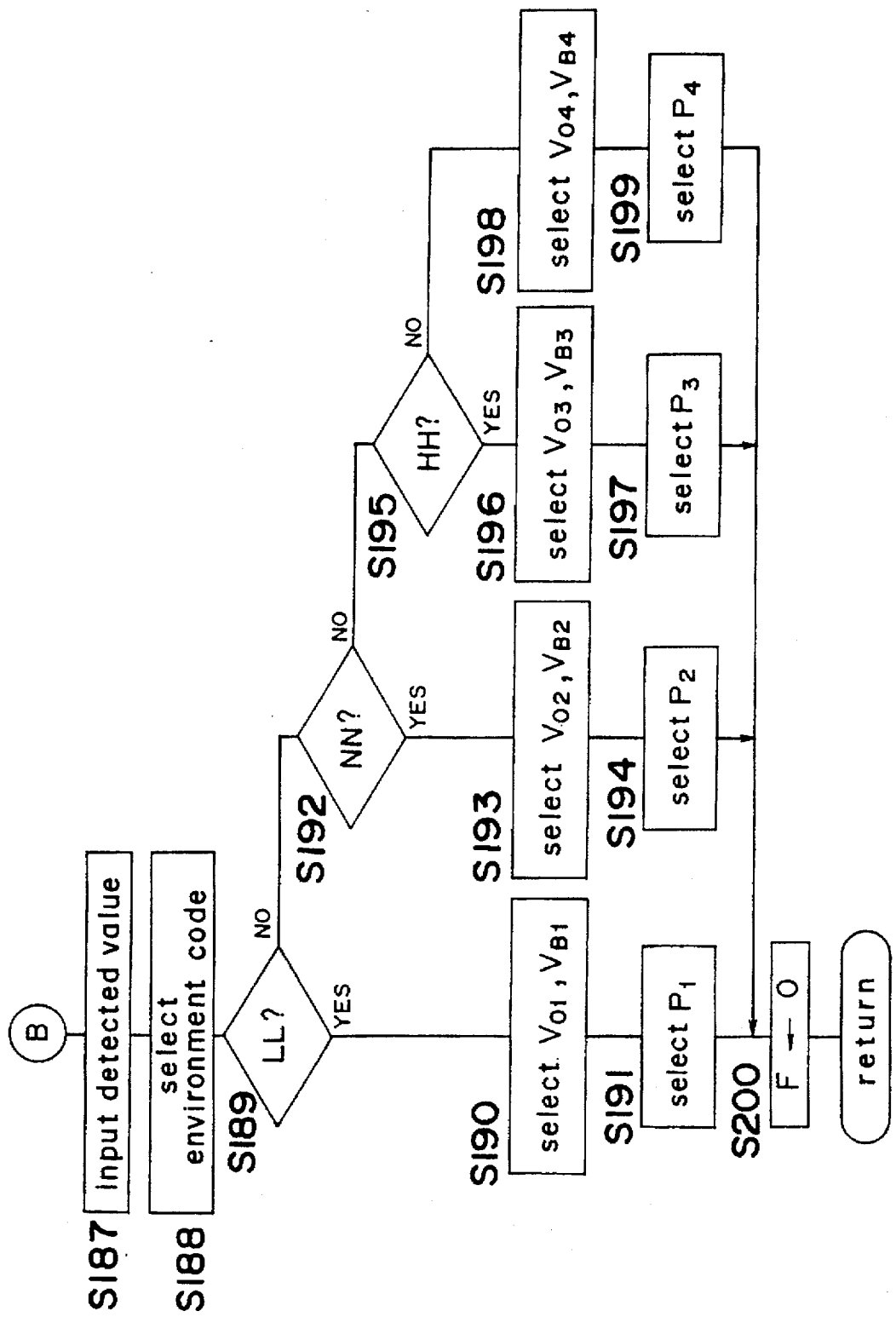

FIGS. 22(a) and 22(b) show a flowchart of the automatic density control wherein a change in density according to a change in environment is detected with the AIDC sensor 203 so as to select $V_O$ and $V_B$ in order to compensate the density to the standard density and to change the laser intensity for exposure according to the selected values $V_O$ and $V_B$ in order to realize appropriate gamma correction.

The steps of S181–S187 are similar to the counterparts in FIG. 20, and detailed explanations are omitted. In those steps, a standard pattern is formed, and an environment code is selected according to the detected density of the standard pattern.

The remaining steps S188–S200 will be explained below. First, an environment code is selected according to the density detected with the AIDC sensor 203 and the standard density determined beforehand (step S188). The environment code which represents the environment is selected to be LL if the detected density is smaller than the standard density, NN if the former is equal to the latter, HH if the former is larger than the latter, and SHH if the former is much larger than the latter.

If it is decided that the environment code is LL (low-temperature low-humidity) (YES at step S189), surface electric potential $V_{O1}$ (=−800 V) and development bias electric voltage $V_{B1}$ (=−600 V) are selected (step S190), and laser intensity $P_1$ for the gamma correction is selected (step S190). Then, the program proceeds to step S200.

If it is decided that the environment code is NN (standard environment) (YES at step S192), surface electric potential $V_{O2}$ (=−700 V) and development bias electric voltage $V_{B2}$ (=−500 V) are selected (step S193), and laser intensity $P_2$ for the gamma correction is selected (step S194). Then, the program proceeds to step S200.

If it is decided that the environment code is HH (high-temperature high-humidity) (YES at step S195), surface electric potential $V_{O3}$ (=−600 V) and development bias electric voltage $V_{B3}$ (=−400 V) are selected (step S196), and laser intensity $P_3$ for the gamma correction is selected (step S197). Then, the program proceeds to step S200.

If it is decided that the environment code is SHH (higher-temperature higher-humidity) (NO at step S195), surface electric potential $V_{O4}$ (=−500 V) and development bias electric voltage $V_{B4}$ (=−300 V) are selected (step S198), and laser intensity $P_4$ for the gamma correction is selected (step S197). Then, the program proceeds to step S200.

Finally, the flag F is reset to zero (step S200) in order to show that automatic density control is completed, and the program returns to the main flow.

In the intensity modulation method for gradation correction, the laser intensity $P_1$–$P_4$ represents a change in the intensity of laser beam under a constant pulse width, while in the pulse width modulation method, the laser intensity $P_1$–$P_4$ represents a change in the pulse width of laser beam under a constant laser intensity of laser beam.

A change in environment is detected indirectly with the AIDC sensor 203 for automatic density control, through a change in the amount of adhered toners. However, a change in environment can be detected directly for example with the temperature-humidity sensor 205. Further, it is also possible that the AIDC sensor 203 and the temperature humidity sensor 205 can be combined for density compensation.

The number of the steps of environment is set to be four in the above-mentioned embodiment. However, the number can be increased for finer gradation compensation.

(h) photoconductor characteristic and gamma characteristic

The photoconductor characteristic to be used in the present invention will be explained below.

Figure 23:
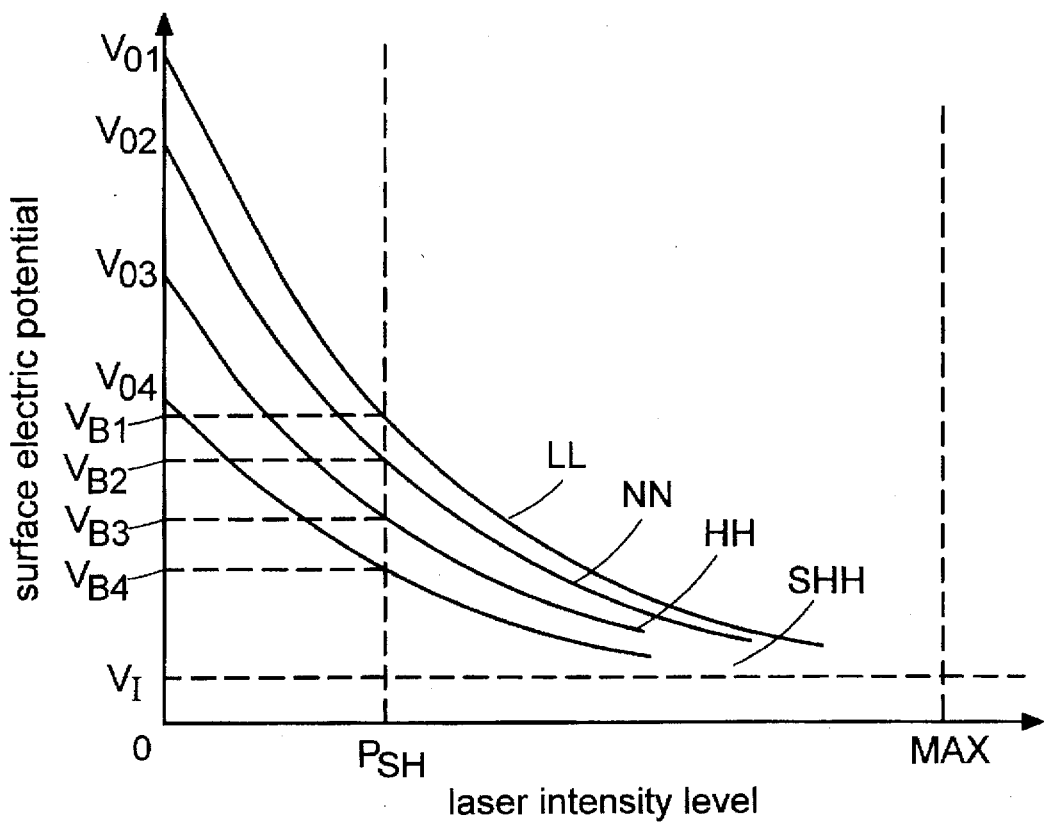
FIG. 23 is a graph of photoconductor characteristic between the photoconductor surface electric potential and the laser intensity level.

FIG. 23 shows an example of photoconductor characteristic curves which represent the relation of the surface electric potential to the light intensity of laser beam for exposure. The four curves LL, NN, HH and SHH corresponding to the photoconductor characteristic when the surface electric potential of the photoconductor $V_O$ are $V_{O1}$, $V_{O2}$, $V_{O3}$ and $V_{O4}$ before exposure, respectively. It is to be understood in these curves that the surface electric potential decreases by an amount of the same ratio between the highest electric potential before exposure and the lowest electric potential when the surface electric potential changes. Finally, the surface electric potential $V_I$ when the photoconductor is exposed at the maximum intensity of laser beam can be regarded to be almost the same because $V_I$ does not vary so much with $V_O$.

From these characteristics of photoconductor, if a bias electric potential $V_{B2}$ of the curve NN is set to be a value and the other bias electric potentials $V_{B1}$, $V_{B3}$ and $V_{B4}$ of the curves LL, HH and SHH, respectively, are chosen so as to satisfy a relation, $$(V_{B2} - V_I)/(V_{O2} - V_I)$$
$$= (V_{B1} - V_I)/(V_{O1} - V_I)$$
$$= (V_{B3} - V_I)/(V_{O3} - V_I)$$
$$= (V_{B4} - V_I)/(V_{O4} - V_I),$$

the points in these curves of the surface electric potential $V_{B1}$, $V_{B2}$, $V_{B3}$ and $V_{B4}$ of the photoconductor align on a vertical line parallel to the ordinate, as shown in FIG. 23. Therefore, the minimum laser exposure level or the threshold level $P_{SH}$ for development with toners is almost the same when each of the surface electric potentials is set.

Figure 24:
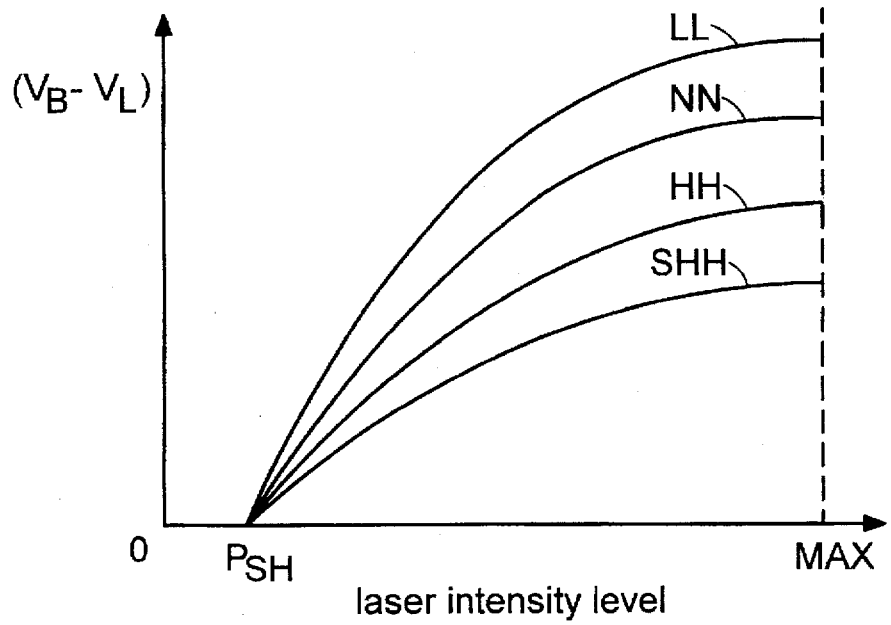
FIG. 24 is a graph of the potential drop from the development bias electric voltage (the amount of adhered toners) plotted against the laser intensity level for a photoconductor having the characteristics shown in FIG. 23.

FIG. 24 shows the difference $V_B-V_L$ between the development bias electric potential $V_B$ and the surface electric potential $V_L$ of the photoconductor as a function of laser light intensity for the four values of $V_O$.

If the four curves in FIG. 24 are normalized by a value at the maximum laser light intensity (MAX), they almost overlap each other. Because the amount of the adhered toners on development is determined by a value of $(V_B-V_L)$, the gamma characteristics of these four cases agree with each other.

By using the characteristics of the photoconductor, the gamma characteristic can be kept constant even when the surface electric potential $V_O$ is changed if the following relation is satisfied:

$$(V_B-V_I)/(V_O-V_I)=\beta,$$

wherein $\beta$ is a constant.

Further, if the constant $\beta$ can be selected by a user, the gradation characteristic can be changed so as realize a reproduced image according to the request by a user, as will be explained below.

Figure 25:
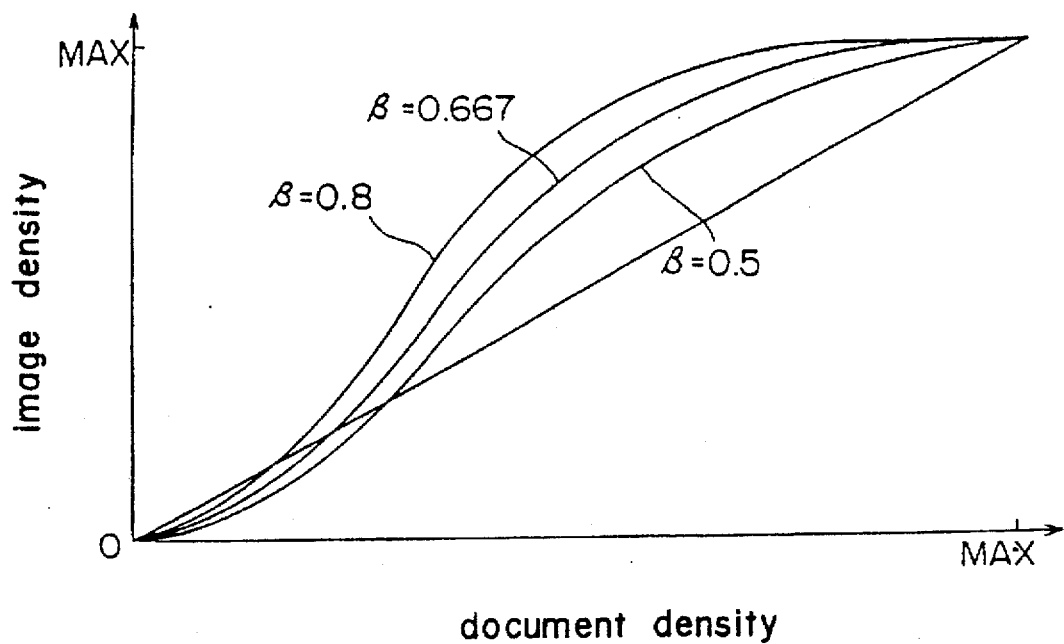
FIG. 25 is a graph of the gamma characteristic for various β values when the laser intensity is changed linearly.

FIG. 25 shows the gamma characteristic curves when $\beta$ is changed linearly. The values of $V_O$, $V_B$ and $V_I$ for three $\beta$ values are compiled in Table 2, wherein $V_B$ and $V_I$ are kept constant while $V_O$ is changed according to $\beta$.

It is clear that the gamma characteristic curve rises sharper with increasing $\beta$.

TABLE 2

| β | $V_O$ | $V_B$ | $V_I$ |
| --- | --- | --- | --- |
| 0.8 | −600 V | −500 V | −100 V |
| 0.667 | −700 V | −500 V | −100 V |
| 0.5 | −800 V | −500 V | −100 V |

Figure 26:
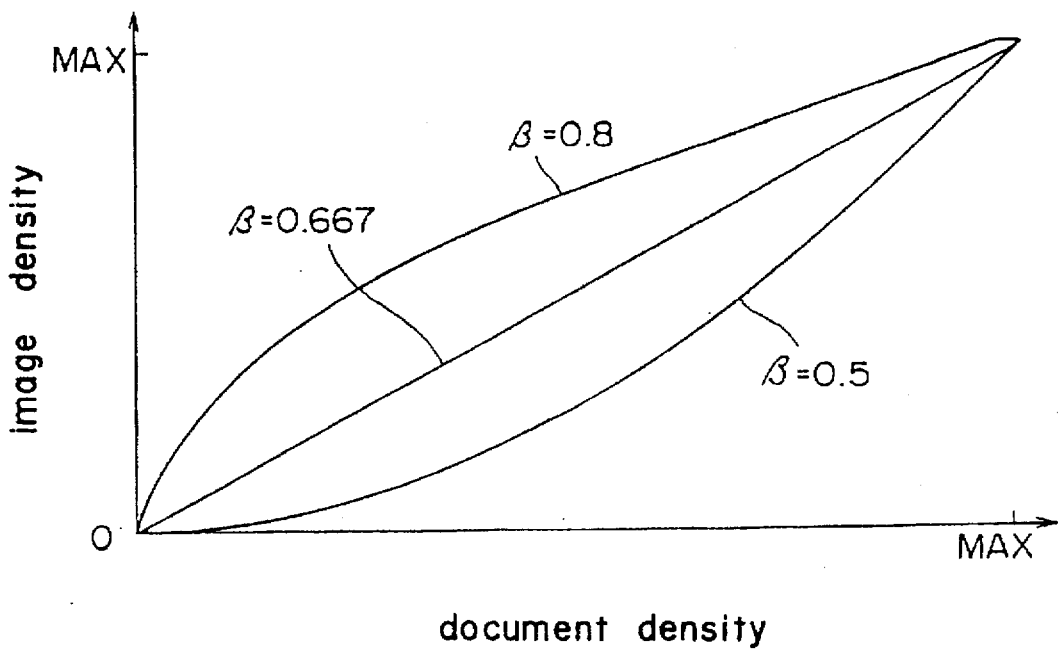
FIG. 26 is a graph of gradation characteristics when the gamma correction is performed according to the gamma characteristic of β=0.667.

FIG. 26 shows the gradation characteristic for three β values when the gamma correction is performed by using as a standard the gamma characteristic of β=0.667 shown in FIG. 25. It is found that if β is increased, the gradation characteristic rises sharper at low densities. This gradation characteristic reproduces an image called low-key generally in printing or the like, and improves the reproducibility of a half-tone image such as a photograph.

On the other hand, if β is decreased, the gradation characteristic rises milder at low densities so that the reproducibility at low densities becomes worse. However, an image of sharp contrast such as a letter or a narrow line can be reproduced better.

As explained above, the quality of reproducibility can be selected according to an image by allowing a user to change β.

Further, the gamma characteristic can be changed while keeping the maximum image density constant if β is set by changing only $V_O$ while by keeping $V_B$ constant as explained in the above-mentioned examples.

(i) another embodiment of manual density control and gamma correction

Figure 27:
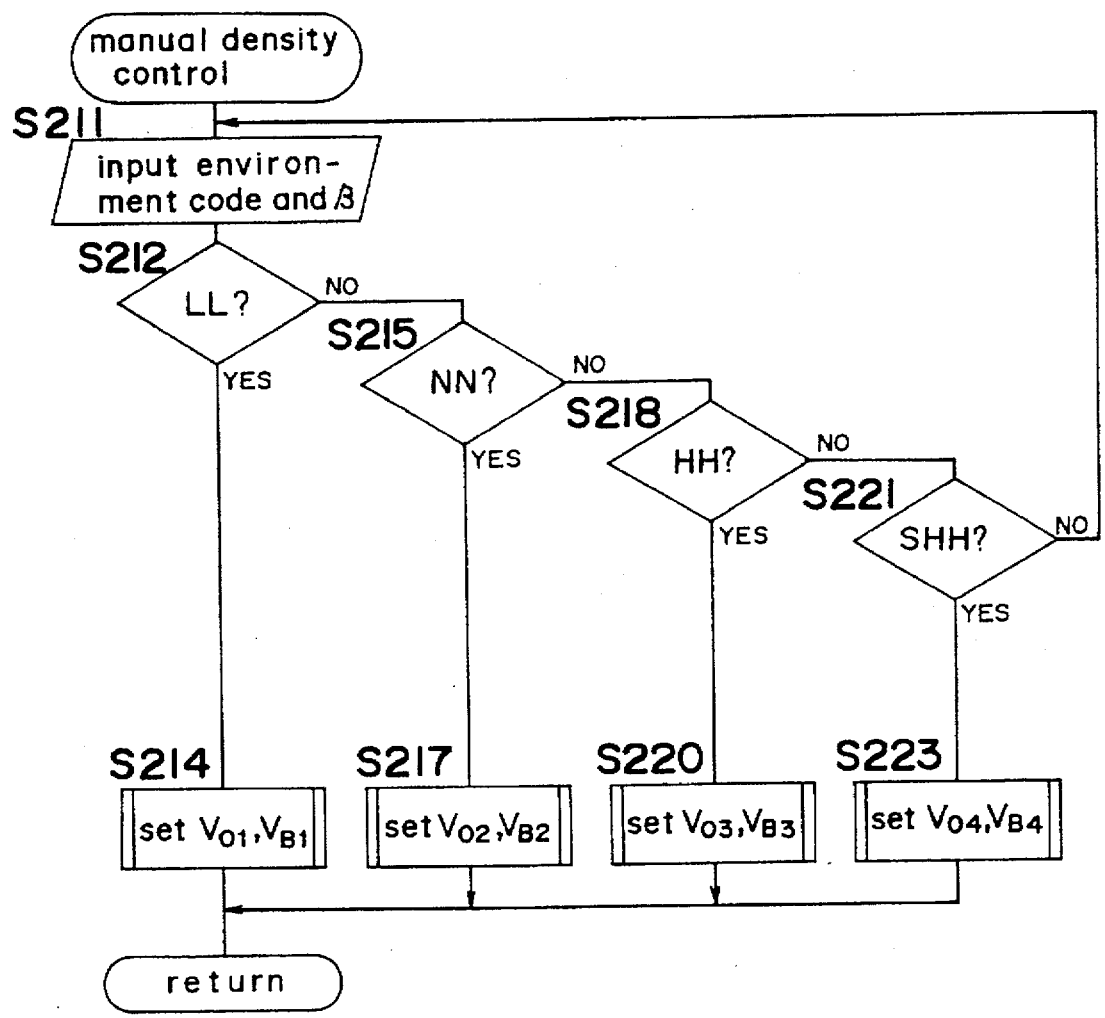
FIG. 27 is a flowchart of manual density control.

In this embodiment, the density and gradation are controlled according to a main flow (not shown) which is the same as that shown in FIG. 17 except the manual density control (step S3), wherein the density is controlled according to the environment code selected by a user manually with a key-input in the operational panel 206, and a value of β (or $V_O$ and $V_B$) is selected according to the environment code so as to prevent a change in the maximum density and the gamma characteristic, as shown in FIG. 27. In this embodiment, the environment code has four steps: LL (low-temperature low-humidity), NN (standard environment), HH (high-temperature high-humidity), and SHH (higher-temperature higher-humidity).

The values of the development bias electric voltage $V_B$ for each environment code LL, NN, HH, SHH are $V_{B1}$ (=−567 V), $V_{B2}$ (=−500 V), $V_{B3}$ (=−433 V) and $V_{B4}$ (=−367 V), respectively, and they are stored in the data ROM 209. In the following, the latent image electric potential $V_I$ is taken as −100 V, that is, it is constant irrespective of $V_O$ as a characteristic of the photoconductor.

FIG. 27 shows a flow of the manual density control. First, a key-input of an environment code according to temperature and humidity is received from the operational panel 206, and the value of β governing the gradation characteristic is selected according to the environment code (step S211). In this case, β=0.667.

If the environment code is decided to be LL (YES at step S212), $V_{B1}$ (=−567 V) is selected as the development bias electric voltage, and a value $V_{O1}$ according to $V_{B1}$ and β is selected according to the relation $(V_{B1}-V_I)/(V_{O1}-V_I)=β$. In this case, $V_{O1}$=−800 V. Thus, the $V_G$ unit 214 and the $V_B$ unit 215 are controlled to provide $V_{O1}$ and $V_{B1}$, respectively (step S214). Thus, the gamma characteristic is not changed from that shown as NN in FIG. 10, and the linear gradation characteristic is realized by using the light-emitting characteristic (shown in FIG. 10) according to the gamma characteristic NN.

If the environment code is decided to be NN (YES at step S215), $V_{B2}$ (=−500 V) is selected as the development bias electric voltage, and a value $V_{O2}$ according to $V_{B2}$ and β is selected according to the relation $(V_{B1}-V_I)/(V_{O1}-V_I)=β$. In this case, $V_{O2}$=−700 V. Thus, the $V_G$ unit 214 and the $V_B$ unit 215 are controlled to provide $V_{O2}$ and $V_{B2}$, respectively (step S217). Thus, the gamma characteristic is not changed from that shown as NN in FIG. 10, and the linear gradation characteristic is realized by using the light-emitting characteristic (shown in FIG. 10) according to the gamma characteristic NN.

If the environment code is decided to be HH (YES at step S218), $V_{B3}$ (=−453 V) is selected as the development bias electric voltage, and a value $V_{O3}$ according to $V_{B3}$ and β is selected according to the relation $(V_{B1}-V_I)/(V_{O1}-V_I)=β$. In this case, $V_{O3}$=−600 V. Thus, the $V_G$ unit 214 and the $V_B$ unit 215 are controlled to provide $V_{O1}$ and $V_{B1}$, respectively (step S220). Thus, the gamma characteristic is not changed from that shown as NN in FIG. 10, and the linear gradation characteristic is realized by using the light-emitting characteristic (shown in FIG. 10) according to the gamma characteristic NN.

If the environment code is decided to be SHH (YES at step S221), $V_{B4}$ (=−367 V) is selected as the development bias electric voltage, and a value $V_{O4}$ according to $V_{B4}$ and β is selected according to the relation $(V_{B1}-V_I)/(V_{O4}-V_I)=β$. In this case, $V_{O1}$=−500 V. Thus, the $V_G$ unit 214 and the $V_B$ unit 215 are controlled to provide $V_{O1}$ and $V_{B1}$, respectively (step S214). Thus, the gamma characteristic is not changed from that shown as NN in FIG. 10, and the linear gradation characteristic is realized by using the light-emitting characteristic (shown in FIG. 10) according to the gamma characteristic NN.

If the environment code is decided not to be any of the above-mentioned codes (NO at step S221), the program returns to step S211 for correct key-input.

In this embodiment, β is selected to be 0.667 for realizing the linear gradation characteristic. However, a reproduced image of various kinds of gradation characteristic can be obtained by changing the β value. That is, a reproduced image having gradation characteristic according to the kind of a document such as a half-tone image or according to the taste of a user can be obtained.

(j) AIDC density control and gamma correction

In an embodiment, the density and gradation are controlled with use of AIDC sensor 203. The main flow of this embodiment (not shown) is the same shown in FIG. 19, whereas the automatic density control (step S53) is different from that shown in FIG. 20, as will be explained below.

Figure 29:
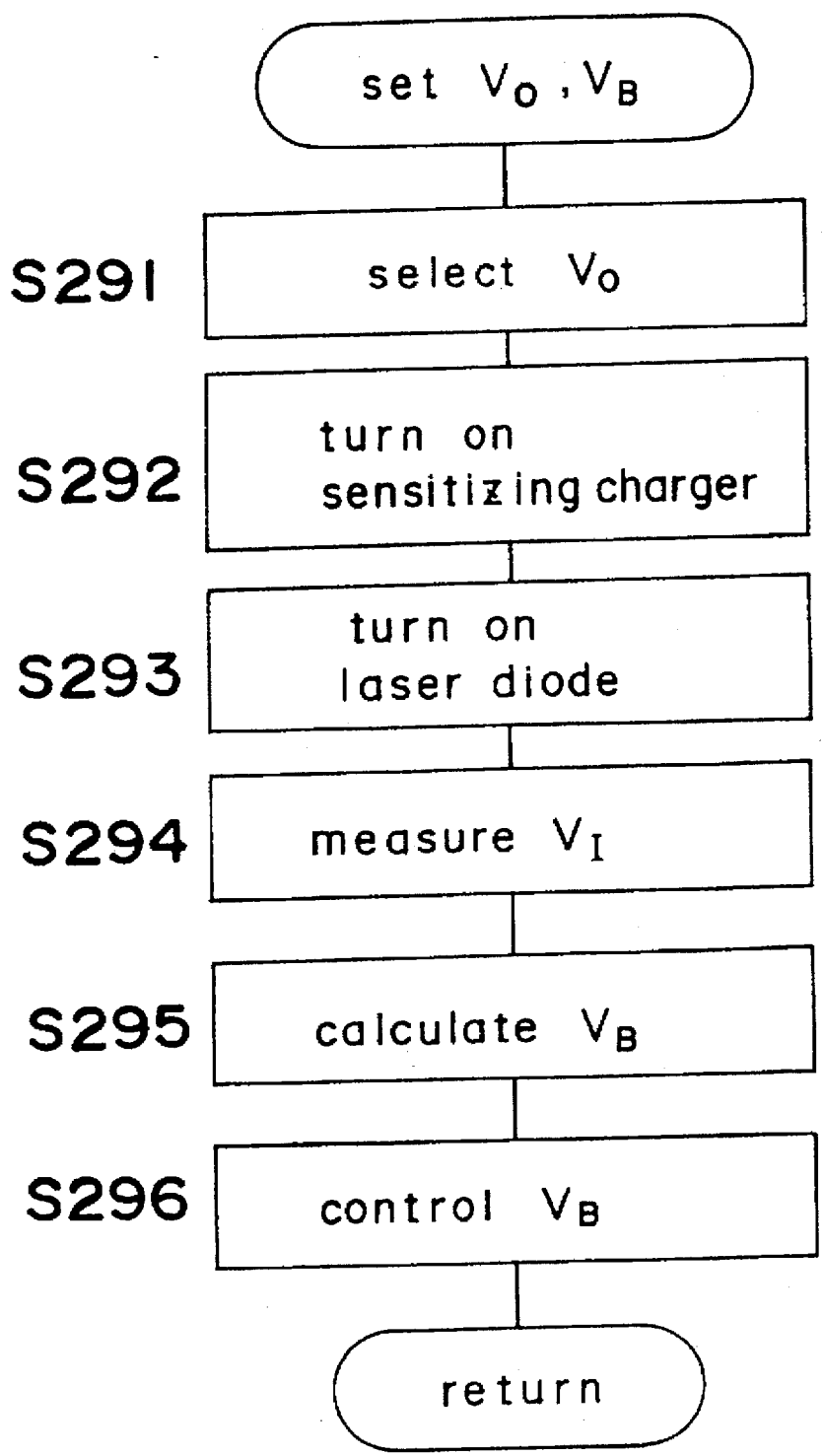
FIG. 29 is a flowchart of setting $V_O$ and $V_B$.

FIG. 29 is a flowchart of the automatic density control with use of AIDC sensor 203, wherein the surface electric potential $V_O$ and the development bias electric voltage $V_B$ are selected according to environment code so as to keep the maximum density and the gamma characteristic constant. In this embodiment, the environment is classified in four kinds: LL (low-temperature low-humidity), NN (standard environment), HH (high-temperature high-humidity) and SHH (higher-temperature higher-humidity).

The values of the development bias electric voltage $V_B$ for each environment code are stored in the data ROM 209, as in other embodiments, while the latent image electric potential $V_I$ is taken as $-100$ V, that is, it is constant irrespective of $V_O$ as a characteristic of the photoconductor.

First, a value of $\beta$ is inputted with the operational panel (step S261). In this case, $\beta$ is set to be 0.667.

Next, the $V_G$ unit 214 and $V_B$ unit 215 are controlled to generate the development bias electric voltage $V_{B2}$ ($=-500$ V) and the surface electric potential $V_{O2}$ ($=-700$ V) for forming a standard toner pattern on the photoconductor drum 41 for the standard environment (step S262). Then, a standard toner pattern is formed on the photoconductor (step S263).

Then, the density of the standard toner pattern is detected with the AIDC sensor 203 which detects the difference between the normally reflecting light and the scattering reflecting light and determins the density by comparing the difference with predetermined values (step S264).

Next, the detected value of the AIDC sensor 203 is compared with the standard value of the standard toner pattern. First, if it is decided that the detected value is equal to the standard value, the flow returns to the main flow because the appropriate values of $V_B$ and $V_O$ have already been set.

If it is decided that the detected value is much larger than the standard value (YES at step S266) or that the environment is SHH (higher-temperature higher-humidity), $V_{B4}$ ($=-367$ V) and $V_{O4}$ ($=-500$ V) are set by the $V_B$ unit 215 and the $V_G$ unit 214, in order to decrease the density, respectively (step S268), and the flow returns to step S263 for forming a standard pattern.

If it is decided that the detected value is larger that the standard value (YES at step S269) or that the environment is HH (high-temperature high-humidity), $V_{B3}$ ($=-433$ V) and $V_{O3}$ ($=-600$ V) are set by the $V_B$ unit 215 and the $V_G$ unit 214, in order to decrease the density, respectively (step S271) and the flow returns to step S263 for forming a standard pattern.

If it is decided that the detected value is lower than the standard value (NO at step S269) or that the environment is LL (low-temperature low-humidity), $V_{B1}$ ($=-567$ V) and $V_{O1}$ ($=-800$ V) are set by the $V_B$ unit 215 and the $V_G$ unit 214, in order to increase the density, respectively (step S273) and the flow returns to step S263 for forming a standard pattern.

In this embodiment $\beta$ is selected to be 0.667 for realizing the linear gradation characteristic. However, a reproduced image of various kinds of gradation characteristic can be obtained by changing the $\beta$ value.

(k) $V_O$, $V_B$ setting when $V_I$ changes

FIG. 29 shows a flowchart of setting $V_O$ and $V_B$.

Figure 28:
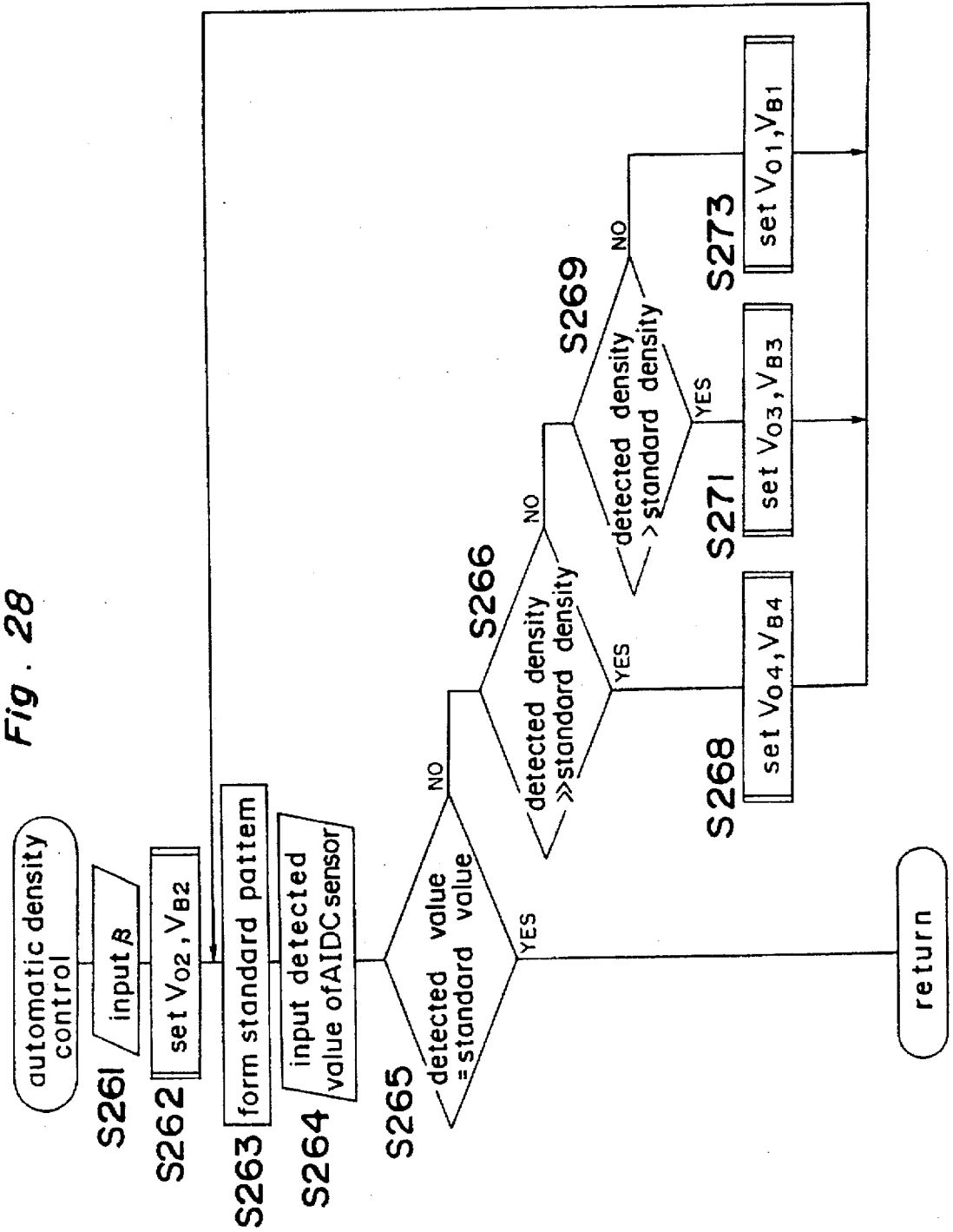
FIG. 28 is a flowchart of automatic density control.

In steps S214, S217, S220 and S223 in FIG. 27 and steps S268, S271 and S273 in FIG. 28, the electric potential $V_I$ after exposure is taken as a constant irrespective of the surface electric potential $V_O$. However, there are cases wherein a change in $V_I$ according to a change in $V_O$ cannot be ignored for example due to the photoconductor characteristic or the maximum laser intensity. In such cases, the flow shown in FIG. 29 is used.

First, the surface electric potential $V_O$ according to the environment to be selected manually or automatically with the AIDC sensor 203 (step S291). Next, the sensitizing charger 43 is sensitized the photoconductor by the $V_G$ unit 214 (step S292), and the laser diode 221 is turned on to expose the photoconductor with a laser intensity enough to lower the surface electric potential to $V_I$ (step S293). Then, $V_I$ is measured with the $V_L$ sensor 60 (step S294). Next, the development bias electric potential $V_B$ is calculated with the values of $V_O$ and $\beta$ by using the relation $(V_B-V_I)/(V_O-V_I)=\beta$ (step S295) and the development bias electric voltage is controlled with the $V_B$ unit 215 to the calculated value $V_B$ (step S296).

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An apparatus for forming an image according to digital data, comprising:
   a photoconductor;
   sensitizing means for sensitizing said photoconductor at a sensitizing electric potential;
   exposure means for exposing said sensitized photoconductor to form an electrostatic latent image;
   development means for developing the electrostatic latent image;
   bias means for supplying a bias electric voltage to said development means, which bias electric voltage being given to toners; and
   control means for controlling a ratio of a variable difference between the sensitizing electric potential and an electric potential of the electrostatic latent image exposed at a maximum quantity of light by said exposure means with respect to a variable difference between the development bias electric potential supplied by said bias means and the electric potential of the electrostatic latent image exposed at the maximum quantity of light so that the ratio is kept constant.

2. An apparatus according to claim 1, wherein said control means controls the sensitizing means so that the sensitizing electric potential has a value to keep the ratio constant.

3. An apparatus according to claim 2, further comprising detection means for detecting the electric potential of an electrostatic latent image formed by said exposure means.

4. An apparatus according to claim 2, further comprising input means for inputting the ratio which has to be kept constant.

5. An apparatus according to claim 1 wherein said exposure means exposes said photoconductor at a quantity of light based on the digital image data.

6. An apparatus according to claim 1, wherein said control means controls said bias means so that the development bias electric voltage has a value to keep the ratio constant.

7. An apparatus according to claim 6, further comprising detection means for detecting the electric potential of an electrostatic latent image formed by said exposure means.

8. An apparatus according to claim 6, further comprising input means for inputting the ratio which has to be kept constant.

9. An apparatus according to claim 6, wherein said exposure means exposes said photoconductor at a quantity of light determined by the digital image data.

10. An apparatus according to claim 1, wherein said control means controls said sensitizing means and said bias means so that the sensitizing electric potential and the development bias electric voltage have values to satisfy the ratio constant.

11. An apparatus according to claim 10, further comprising detection means for detecting the electric potential of an electrostatic latent image formed by said exposure means.

12. An apparatus according to claim 10, further comprising input means for inputting the ratio which has to be kept constant.

13. An apparatus according to claim 10, wherein said exposure means exposes said photoconductor at a quantity of light based on the digital image data.

14. An apparatus for forming an image according to digital data, comprising:

a photoconductor;

sensitizing means for sensitizing said photoconductor at a sensitizing electric potential;

exposure means for exposing said photoconductor to be sensitized beforehand by said sensitizing means to form an electrostatic latent image;

development means for developing the electrostatic latent image;

supply means for supplying a bias electric voltage to said development means, which bias electric voltage being given to toners;

selection means for selecting a value; and control means for controlling a ratio of a difference voltage between the sensitizing electric potential and an electric potential of the electrostatic latent image exposed at the maximum quantity of light by said exposure means with respect to a difference voltage between the development bias electric potential supplied by said supply means and the electric potential of the electrostatic latent image so that the ratio has the value selected by said selection means.

15. An apparatus according to claim 14, wherein said selection means select a value among a plurality of values.

16. An apparatus according to claim 15, wherein the plurality of values selected by said selection means represent a density of an image developed by said development means.

* * * * *

UNITED STATES PATENT AND TRADEMARK OFFICE
CERTIFICATE OF CORRECTION

PATENT NO. : 5,719,613
DATED : February 17, 1998
INVENTOR(S) : Kazuyuki FUKUI et al.

It is certified that error appears in the above-identified patent and that said Letters Patent is hereby corrected as shown below:

On the front page of the patent, please add:

-- [*] Notice: The term of this patent shall not extend beyond the expiration date of Pat. No. 5,206,686 --.

Signed and Sealed this

Ninth Day of June, 1998

Attest:

BRUCE LEHMAN

Attesting Officer

Commissioner of Patents and Trademarks